US007868130B2

(12) United States Patent
Yount et al.

(10) Patent No.: US 7,868,130 B2
(45) Date of Patent: *Jan. 11, 2011

(54) MULTI-LEVEL TUBULAR REACTOR WITH VERTICALLY SPACED SEGMENTS

(75) Inventors: Thomas Lloyd Yount, Kingsport, TN (US); Bruce Roger DeBruin, Lexington, SC (US); Michael Paul Ekart, Kingsport, TN (US); Larry Cates Windes, Kingsport, TN (US); David Allen Sliger, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 595 days.

This patent is subject to a terminal disclaimer.

(21) Appl. No.: 11/776,597

(22) Filed: Jul. 12, 2007

(65) Prior Publication Data
US 2009/0016939 A1 Jan. 15, 2009

(51) Int. Cl.
*C08G 63/00* (2006.01)
*C08G 63/02* (2006.01)
(52) U.S. Cl. ............. 528/308.1; 422/129; 422/131; 422/137; 422/138; 526/64; 528/171; 528/176; 528/271; 528/272
(58) Field of Classification Search ............. 422/129, 422/131, 137, 138; 526/64; 528/171, 176, 528/271, 272, 308.1
See application file for complete search history.

(56) References Cited

U.S. PATENT DOCUMENTS

| | | | |
|---|---|---|---|
| 1,422,182 A | 7/1922 | Curme |
| 2,361,717 A | 10/1944 | Taylor |
| 2,614,648 A | 10/1952 | Wilson |
| 2,709,642 A | 5/1955 | Mann, Jr. et al. |
| 2,727,882 A | 12/1955 | Vodonik |
| 2,753,249 A | 7/1956 | Idenden et al. |
| 2,820,815 A | 1/1958 | Matuszak et al. |
| 2,829,153 A | 4/1958 | Vodonik |
| 2,905,707 A | 9/1959 | Hurt et al. |
| 2,973,341 A | 2/1961 | Hippe et al. |
| 3,044,993 A | 7/1962 | Tiemersma |
| 3,052,711 A | 9/1962 | Glogau et al. |
| 3,054,776 A | 9/1962 | Higgins |
| 3,110,547 A | 11/1963 | Emmert |
| 3,113,843 A | 12/1963 | Li |
| 3,161,710 A | 12/1964 | Turner |
| 3,174,830 A | 3/1965 | Watzl et al. |
| 3,185,668 A | 5/1965 | Meyer et al. |
| 3,192,184 A | 6/1965 | Brill et al. |
| 3,241,926 A | 3/1966 | Parker et al. |
| 3,250,747 A | 5/1966 | Mitchell, Jr. et al. |
| 3,251,657 A | 5/1966 | Bachmann et al. |
| 3,254,965 A | 6/1966 | Ogle |
| 3,376,353 A | 4/1968 | Tate |
| 3,385,881 A | 5/1968 | Bachmann et al. |
| 3,390,965 A | 7/1968 | Ditmar |
| 3,402,023 A | 9/1968 | Dobo |
| 3,427,287 A | 2/1969 | Pengilly |
| 3,438,942 A | 4/1969 | Scheller |
| 3,442,868 A | 5/1969 | Ogata et al. |
| 3,458,467 A | 7/1969 | Herrie et al. |
| 3,468,849 A | 9/1969 | Rothert |
| 3,480,587 A | 11/1969 | Porter |
| 3,487,049 A | 12/1969 | Busot |
| 3,496,146 A | 2/1970 | Mellichamp, Jr. |
| 3,496,159 A | 2/1970 | Spence |
| 3,496,220 A | 2/1970 | McCarty et al. |
| 3,497,473 A | 2/1970 | Kemkes |
| 3,507,905 A | 4/1970 | Girantet et al. |
| 3,509,203 A | 4/1970 | Michaelis et al. |
| 3,511,615 A | 5/1970 | Roget et al. |
| 3,522,214 A | 7/1970 | Crawford et al. |
| 3,534,082 A | 10/1970 | Armstrong et al. |
| 3,551,396 A | 12/1970 | Lanthier |
| 3,582,244 A | 6/1971 | Siclari et al. |
| 3,590,070 A | 6/1971 | Martin et al. |
| 3,590,072 A | 6/1971 | Leybourne |
| 3,595,846 A | 7/1971 | Rouzier |
| 3,600,137 A | 8/1971 | Girantet et al. |
| 3,609,125 A | 9/1971 | Fujimoto et al. |

(Continued)

FOREIGN PATENT DOCUMENTS

BE 780142 3/1972

(Continued)

OTHER PUBLICATIONS

Copending U.S. Appl. No. 11/506,105, filed Aug. 17, 2006, Bruce Roger DeBruin.

(Continued)

*Primary Examiner*—Terressa M Boykin
(74) *Attorney, Agent, or Firm*—Jennifer R. Knight; Bernard J. Graves, Jr.

(57) ABSTRACT

A multi-level tubular reactor operable to facilitate a chemical reaction in a reaction medium flowing therethrough. The tubular reactor can include a plurality of horizontally elongated and vertically spaced reactor segments coupled to and extending outwardly from a common header. One or more of the reactor segments can contain a tray that divides the internal volume of the reactor segment into upper and lower chambers. The reaction medium can flow away from the header in the upper chambers and back to the header in the lower chambers.

69 Claims, 3 Drawing Sheets

U.S. PATENT DOCUMENTS

| | | |
|---|---|---|
| 3,639,448 A | 2/1972 | Matsuzawa et al. |
| 3,644,096 A | 2/1972 | Lewis et al. |
| 3,644,294 A | 2/1972 | Siclari et al. |
| 3,644,483 A | 2/1972 | Griehl et al. |
| 3,646,102 A | 2/1972 | Kobayashi et al. |
| 3,647,758 A | 3/1972 | Ryffel et al. |
| 3,651,125 A | 3/1972 | Lewis et al. |
| 3,676,485 A | 7/1972 | Lewis et al. |
| 3,684,459 A | 8/1972 | Tate et al. |
| 3,689,461 A | 9/1972 | Balint et al. |
| 3,697,579 A | 10/1972 | Balint et al. |
| 3,723,391 A | 3/1973 | Beer et al. |
| 3,740,267 A | 6/1973 | Haylock et al. |
| 3,781,213 A | 12/1973 | Siclari et al. |
| 3,787,479 A | 1/1974 | Grehl et al. |
| 3,819,585 A | 6/1974 | Funk et al. |
| 3,841,836 A | 10/1974 | Lunsford et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,982 A | 12/1975 | Chapman et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,019,866 A | 4/1977 | Jaswal et al. |
| 4,020,049 A | 4/1977 | Rinehart |
| 4,028,307 A | 6/1977 | Ure |
| 4,032,563 A | 6/1977 | Harper et al. |
| 4,039,515 A | 8/1977 | Rebhan et al. |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,148,693 A | 4/1979 | Williamson |
| 4,196,168 A | 4/1980 | Lewis |
| 4,200,145 A | 4/1980 | Underwood |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A | 3/1981 | Dicoi et al. |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,424,301 A | 1/1984 | Klippert et al. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,529,787 A | 7/1985 | Schmidt et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,588,560 A | 5/1986 | Degnan et al. |
| 4,612,363 A | 9/1986 | Sasaki et al. |
| 4,670,580 A | 6/1987 | Maurer |
| 4,675,377 A | 6/1987 | Mobley et al. |
| 4,680,345 A | 7/1987 | Kobayashi et al. |
| 4,680,376 A | 7/1987 | Heinze et al. |
| 4,721,575 A | 1/1988 | Binning et al. |
| 4,952,302 A | 8/1990 | Leach |
| 4,952,627 A | 8/1990 | Morita et al. |
| 4,973,655 A | 11/1990 | Pipper et al. |
| 5,002,116 A | 3/1991 | Hoagland et al. |
| 5,037,955 A | 8/1991 | Dighton |
| 5,041,525 A | 8/1991 | Jackson |
| 5,064,935 A | 11/1991 | Jackson et al. |
| 5,110,325 A | 5/1992 | Lerner |
| 5,162,488 A | 11/1992 | Mason |
| 5,185,426 A | 2/1993 | Verheijen et al. |
| 5,194,525 A | 3/1993 | Miura et al. |
| 5,202,463 A | 4/1993 | Ruszkay |
| 5,236,558 A | 8/1993 | Buyalos et al. |
| 5,243,022 A | 9/1993 | Kim et al. |
| 5,245,057 A | 9/1993 | Shirtum |
| 5,254,288 A | 10/1993 | Verheijen et al. |
| 5,294,305 A | 3/1994 | Craft, Sr. et al. |
| 5,300,626 A | 4/1994 | Jehl et al. |
| 5,324,853 A | 6/1994 | Jones et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,434,239 A | 7/1995 | Bhatia |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,476,919 A | 12/1995 | Shaeffer |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,536,856 A | 7/1996 | Harrison et al. |
| 5,573,820 A | 11/1996 | Harazoe et al. |
| 5,594,077 A | 1/1997 | Groth et al. |
| 5,599,900 A | 2/1997 | Bhatia |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,750,079 A | 5/1998 | Ueda et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,816,700 A | 10/1998 | Starke, Sr. et al. |
| 5,830,981 A | 11/1998 | Koreishi et al. |
| 5,849,849 A | 12/1998 | Bhatia |
| 5,889,127 A | 3/1999 | Iiyama et al. |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |

| | | | | | | |
|---|---|---|---|---|---|---|
| 6,100,369 | A | 8/2000 | Miyajima et al. | FR | 2302778 A1 | 3/1975 |
| 6,103,859 | A | 8/2000 | Jernigan et al. | GB | 777 128 | 6/1957 |
| 6,111,035 | A | 8/2000 | Sakamoto et al. | GB | 777 628 | 6/1957 |
| 6,111,064 | A | 8/2000 | Maurer et al. | GB | 1001787 | 8/1965 |
| 6,113,997 | A | 9/2000 | Massey et al. | GB | 1013034 | 12/1965 |
| 6,127,493 | A | 10/2000 | Maurer et al. | GB | 1055918 | 1/1967 |
| 6,174,970 | B1 | 1/2001 | Braune | GB | 1122538 | 8/1968 |
| 6,252,034 | B1 | 6/2001 | Uenishi et al. | GB | 1154538 | 6/1969 |
| 6,339,031 | B1 | 1/2002 | Tan | GB | 1 277 376 | 6/1972 |
| 6,355,738 | B2 | 3/2002 | Nakamachi | GB | 1320769 | 6/1973 |
| 6,359,106 | B1 | 3/2002 | Nakamoto et al. | GB | 2010294 | 6/1979 |
| 6,399,031 | B1 | 6/2002 | Herrmann et al. | GB | 2020194 | 11/1979 |
| 6,458,916 | B1 | 10/2002 | Yamaguchi et al. | GB | 2 052 535 | 1/1981 |
| 6,545,176 | B1 | 4/2003 | Tsay et al. | GB | 2052535 | 1/1981 |
| 6,551,517 | B1 | 4/2003 | Sentagnes et al. | JP | 42 4993 B | 3/1967 |
| 6,576,774 | B2 | 6/2003 | Scardino et al. | JP | 42 18353 B | 9/1967 |
| 6,590,062 | B2 | 7/2003 | Yamaguchi et al. | JP | 47 39043 A | 4/1971 |
| 6,623,643 | B2 | 9/2003 | Chisholm et al. | JP | 48 94795 A | 12/1973 |
| 6,631,892 | B1 | 10/2003 | Erickson | JP | 49 28698 A | 3/1974 |
| 6,642,407 | B2 | 11/2003 | Rao et al. | JP | 49 34593 A | 3/1974 |
| 6,703,454 | B2 | 3/2004 | Debruin | JP | 49 105893 A | 10/1974 |
| 6,723,826 | B2 | 4/2004 | Yamaguchi et al. | JP | 50 82197 A | 7/1975 |
| 6,814,944 | B1 | 11/2004 | Matsui et al. | JP | 51 29460 A | 3/1976 |
| 6,815,525 | B2 | 11/2004 | Debruin | JP | 51 100036 A | 9/1976 |
| 6,861,494 | B2 | 3/2005 | Debruin | JP | 51 136788 A | 11/1976 |
| 6,906,164 | B2 | 6/2005 | Debruin | JP | 51 136789 A | 11/1976 |
| 6,916,939 | B2 | 7/2005 | Yamane et al. | JP | 52 51495 A | 4/1977 |
| 7,008,546 | B2 | 3/2006 | Edmondson | JP | 52 71432 A | 6/1977 |
| 7,049,462 | B2 | 5/2006 | Nagare et al. | JP | 52 78845 A | 7/1977 |
| 7,074,879 | B2 | 7/2006 | Debruin et al. | JP | 52 83424 A | 7/1977 |
| 7,658,817 | B2 | 2/2010 | Fukuoka et al. | JP | 52 87133 A | 7/1977 |
| 2002/0128399 | A1 | 9/2002 | Nakamoto et al. | JP | 53 31793 A | 3/1978 |
| 2002/0161166 | A1 | 10/2002 | Nakane et al. | JP | 53 34894 A | 3/1978 |
| 2002/0180099 | A1 | 12/2002 | Keillor, III | JP | 54 41833 A | 4/1979 |
| 2003/0037910 | A1 | 2/2003 | Smymov | JP | 54 76535 A | 6/1979 |
| 2003/0104203 | A1 | 6/2003 | Tam et al. | JP | 54 79242 A | 6/1979 |
| 2003/0133856 | A1 | 7/2003 | Le | JP | 54 100494 A | 8/1979 |
| 2003/0191326 | A1 | 10/2003 | Yamane et al. | JP | 54 157536 A | 12/1979 |
| 2004/0068070 | A1 | 4/2004 | Martan et al. | JP | 55 41328 A | 3/1980 |
| 2004/0197618 | A1 | 10/2004 | Harada et al. | JP | 55 108422 A | 8/1980 |
| 2004/0249111 | A1 | 12/2004 | Debruin | JP | 55 135133 A | 10/1980 |
| 2005/0059782 | A1 | 3/2005 | Andrist et al. | JP | 58 129020 A | 8/1983 |
| 2005/0222371 | A1 | 10/2005 | Wilhelm et al. | JP | 59 47226 A | 3/1984 |
| 2006/0008661 | A1 | 1/2006 | Wijesundara et al. | JP | 59 53530 A | 3/1984 |
| 2006/0251546 | A1 | 11/2006 | Yount et al. | JP | 59 68326 A | 4/1984 |
| 2006/0251547 | A1 | 11/2006 | Windes et al. | JP | 59 71326 A | 4/1984 |
| 2007/0037959 | A1 | 2/2007 | DeBruin | JP | 60 15421 A | 1/1985 |
| 2008/0139760 | A1 | 6/2008 | DeBruin | JP | 60 72845 A | 4/1985 |
| 2009/0018281 | A1* | 1/2009 | DeBruin et al. ............... 526/64 | JP | 60 115551 A | 6/1985 |
| 2009/0018282 | A1* | 1/2009 | Yount et al. ................... 526/64 | JP | 60 120839 A | 6/1985 |

FOREIGN PATENT DOCUMENTS

| | | | | | |
|---|---|---|---|---|---|
| | | | JP | 60 163918 A | 8/1985 |
| | | | JP | 60 226846 A | 11/1985 |
| | | | JP | 62 207325 A | 9/1987 |
| BR | 7906279 | 7/1981 | JP | 62 292831 A | 12/1987 |
| DE | 2200832 | 1/1972 | JP | 64 56726 A | 3/1989 |
| DE | 125 798 | 5/1977 | JP | 1 102044 A | 4/1989 |
| DE | 126 073 | 6/1977 | JP | 3 192118 A | 8/1991 |
| DE | 146 298 | 2/1981 | JP | 3 292323 A | 12/1991 |
| DE | 206 558 | 2/1984 | JP | 5-78402 | 3/1993 |
| DE | 229 415 | 11/1985 | JP | 5 155994 A | 6/1993 |
| DE | 4235785 A1 | 5/1994 | JP | 6 247899 A | 9/1994 |
| DE | 195 25 579 | 12/1996 | JP | 7 118208 A | 5/1995 |
| DE | 195 37 930 | 4/1997 | JP | 7 173268 A | 7/1995 |
| DE | 103 36 164 A1 | 3/2005 | JP | 7 238151 A | 9/1995 |
| DE | 10 2004 038 466 | 10/2005 | JP | 7 313 865 | 12/1995 |
| DE | 10 2004 034 708 A1 | 2/2006 | JP | 8 198960 A | 8/1996 |
| EP | 0 070 707 A1 | 1/1983 | JP | 8 283398 A | 10/1996 |
| EP | 0 105 111 | 7/1983 | JP | 10 36495 A | 2/1998 |
| EP | 0 105 111 A1 | 7/1983 | JP | 10 259244 A | 9/1998 |
| EP | 0 850 962 A2 | 7/1998 | JP | 11 092555 A | 4/1999 |
| EP | 0 999 228 A2 | 5/2000 | JP | 11 106489 A | 4/1999 |
| EP | 1 065 193 A1 | 1/2001 | JP | 11 217429 A | 8/1999 |
| FR | 2168990 | 9/1973 | JP | 2000/095851 A | 4/2000 |

| | | |
|---|---|---|
| JP | 2004 238329 | 8/2004 |
| KR | 1993-0005144 B1 | 6/1993 |
| KR | 1994-0011540 B1 | 3/1994 |
| NL | 6704303 | 9/1967 |
| PL | 136188 | 8/1987 |
| SU | 973552 | 11/1982 |
| WO | 95/29752 | 11/1995 |
| WO | WO 96/22318 | 7/1996 |
| WO | WO 98/08602 | 3/1998 |
| WO | WO 98/10007 | 3/1998 |
| WO | WO 99/16537 | 4/1999 |
| WO | 99/39815 | 8/1999 |
| WO | WO 02/26841 A1 | 4/2002 |
| WO | WO 02/46266 A2 | 6/2002 |
| WO | WO 02/096975 A1 | 12/2002 |
| WO | WO 03/006526 A1 | 1/2003 |
| WO | 2004/111104 | 12/2004 |
| WO | WO 2006 007966 A1 | 2/2006 |
| WO | WO 2006/083250 A1 | 8/2006 |
| WO | 2007/065211 | 6/2007 |
| WO | WO 2007/065211 | 6/2007 |

OTHER PUBLICATIONS

Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/820,244, filed Jun. 19, 2007, Bruce Roger DeBruin.
Copending U.S. Appl. No. 11/891,149, filed Aug. 9, 2007, Bruce Roger DeBruin.
Copending U.S. Appl. No. 11/635,411, filed Dec. 7, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/919,931, filed Aug. 17, 2004, Bruce Roger DeBruin.
Copending U.S. Appl. No. 11/776,599, filed Jul. 12, 2007, Bruce Roger DeBruin.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,600, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,603, filed Jul. 12, 2007, Bruce Roger DeBruin et al.
Copending U.S. Appl. No. 11/776,591, filed Jul. 12, 2007, Bruce Roger DeBruin et al.
Copending U.S. Appl. No. 11/715,564, filed Mar. 8, 2007, Bruce Roger DeBruin.
Copending U.S. Appl. No. 11/715,546, filed Mar. 8, 2007, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
USPTO office action dated Oct. 23, 2006 for copending U.S. Appl. No. 10/919,931.
USPTO office action dated Jun. 14, 2007 for copending U.S. Appl. No. 11/635,411.
USPTO office action dated Jul. 2, 2007 for copending U.S. Appl. No. 11/506,131.
USPTO office action dated Jul. 2, 2007 for copending U.S. Appl. No. 11/506,132.
USPTO office action dated Jul. 2, 2007 for copending U.S. Appl. No. 11/506,105.
USPTO Notice of Allowance dated Oct. 11, 2007 for copending U.S. Appl. No. 10/919,931.
USPTO office action dated Oct. 11, 2007 for copending U.S. Appl. No. 11/820,244.
USPTO office action dated Dec. 4, 2007 for copending U.S. Appl. No. 11/891,149.
USPTO Notice of Allowance dated Jan. 10, 2008 for copending U.S. Appl. No. 11/506,131.
USPTO Office Action dated Jan. 23, 2008 for copending U.S. Appl. No. 11/635,411.
USPTO Office Action dated Jan. 31, 2008 for copending U.S. Appl. No. 11/506,132.
USPTO Office Action dated Jan. 25, 2008 for copending U.S. Appl. No. 11/506,105.
USPTO Notice of Allowance dated Feb. 13, 2008 for copending U.S. Appl. No. 11/820,244.
USPTO Notice of Allowance dated Mar. 25, 2008 for copending U.S. Appl. No. 11/506,132.
Perry, Robert H. and Green, Don, "Flow in Pipes and Channels," Perry's Chemical Engineer's Handbook, 1984, pp. 5-23, $6^{th}$ Edition, McGraw-Hill, United States.
Perry, Robert H. and Green, Don, "Fluid and Particle Mechanics," Perry's Chemical Engineer's Handbook, 1984, pp. 5-40 to 5-41, $6^{th}$ Edition, McGraw-Hill, United States.
Perry, Robert H. and Green, Don, "Fluid and Particle Mechanics," Perry's Chemical Engineer's Handbook, 1984, 14-82 to 14-95, $6^{th}$ Edition, McGraw-Hill, United States.
Nauman, E.B., "Enhancement of Heat Transfer and Thermal Homogenity with Motionless Mixers," American Institute of Chemical Engineer's Journal, 1979, pp. 246-258, vol. 25, No. 2.
Brodkey, Robert S., "Multiphase Phenomena I: Pipe Flow," The Phenomena of Fluid Motions, 1967, pp. 456-538, Addison-Wesley Publishing Company, United States.
Gupta, S.K. and Kumar, Anil, "Polyester Reactors," Plenum Chemical Engineering Series, 1987, Chapter 8, pp. 241-318, Plenum Press, New York.
Stahl, Wegmann, Von Rohr; Tubular Reactor for Liquid Reactions with Gas Release, 2003, Catalysis Today, 79-80, pp. 89-95.
USPTO Notice of Allowance dated Apr. 29, 2008 for copending U.S. Appl. No. 11/891,149.
Office Action dated May 7, 2008 for copending U.S. Appl. No. 11/506,105.
USPTO Office Action dated May 7, 2008 for copending U.S. Appl. No. 11/506,105.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
Santosh K. Gupta & Anil Kumar, "Step Growth Polymerization," The Plenum Chemical Engineering Series, 1987, Chapter 8, Plenum Press.
USPTO Supplemental Notice of Allowability dated Aug. 27, 2008 in copending U.S. Appl. No. 11/820,244.
USPTO Notice of Allowance dated Jun. 11, 2008 in copending U.S. Appl. No. 11/506,132.
USPTO Notice of Allowance dated Mar. 17, 2008 in copending U.S. Appl. No. 11/506,131.
USPTO Supplemental Notice of Allowability dated Apr. 4, 2008 in copending U.S. Appl. No. 11/506,131.
USPTO Notice of Allowability dated Oct. 7, 2008 in copending U.S. Appl. No. 11/506,105.
USPTO Office Action dated Aug. 20, 2008 for copending U.S. Appl. No. 11/635,411.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.

USPTO Office Action dated Jul. 18, 2008 for copending U.S. Appl. No. 11/506,346.
Ekivana, N.I. et al., "Structure Formation in Terephthalic Acid Pastes," 1968, Chemical Abstracts Service, Columbus OH.
USPTO Notice of Allowance dated Jan. 2, 2009 for copending U.S. Appl. No. 11/891,149.
USPTO Notice of Allowance dated Jan. 28, 2009 for copending U.S. Appl. No. 11/506,346.
USPTO Office Action dated Jan. 30, 2009 for copending U.S. Appl. No. 11/715,546.
USPTO Office Action dated Feb. 4, 2009 for copending U.S. Appl. No. 11/635,411.
USPTO Notice of Allowance dated Apr. 14, 2009 for copending U.S. Appl. No. 11/891,149.
USPTO Office Action dated Apr. 21, 2009 for copending U.S. Appl. No. 11/635,360.
USPTO Office Action dated Apr. 21, 2009 for copending U.S. Appl. No. 11/635,448.
USPTO Office Action dated May 19, 2009, for copending U.S. Appl. No. 12/186,739.
USPTO Office Action dated Jun. 26, 2009 for copending U.S. Appl. No. 12/173,354.
USPTO Office Action dated Jul. 23, 2009 for copending U.S. Appl. No. 11/635,411.
Notice of Allowance dated Sep. 4, 2009 for copending U.S. Appl. No. 11/635,411.
USPTO Notice of Allowance dated Nov. 17, 2009 for copending U.S. Appl. No. 12/173,354.
USPTO Office Action dated Feb. 18, 2010 for copending U.S. Appl. No. 11/776,599.
USPTO Office Action dated Feb. 18, 2010 for copending U.S. Appl. No. 11/776,600.
USPTO Office Action dated Feb. 18, 2010 for copending U.S. Appl. No. 11/776,587.
USPTO Office Action dated Feb. 18, 2010 for copending U.S. Appl. No. 11/776,603.
USPTO Office Action dated Feb. 18, 2010 for copending U.S. Appl. No. 11/776,591.
USPTO Office Action dated Feb. 24, 2010 for copending U.S. Appl. No. 11/776,598.
USPTO Office Action dated Feb. 24, 2010 for copending U.S. Appl. No. 11/776,595.
USPTO Office Action dated Jan. 11, 2010 for copending U.S. Appl. No. 11/635,360.
USPTO Office Action dated Jan. 20, 2010 for copending U.S. Appl. No. 12/186,739.
International Search Report and Written Opinion for PCT/US2008/008336, dated Oct. 23, 2008.
Perry's Chemical Engineers' Handbook, 7th Edition, pp. 8-49 to 8-50 and pp. 14-82 to 14-95, 1997, The McGraw-Hill Companies, Inc., United States.
USPTO Office Action dated May 19, 2009 in copending U.S. Appl. No. 12/186,739.
USPTO Office Action dated Aug. 4, 2009 in copending U.S. Appl. No. 11/506,346.
USPTO Notice of Allowance dated Jun. 23, 2010 in copending U.S. Appl. No. 11/776,595.
USPTO Notice of Allowance dated Jun. 23, 2010 in copending U.S. Appl. No. 11/776,598.
USPTO Notice of Allowance dated Jun. 24, 2010 in copending U.S. Appl. No. 11/776,603.
USPTO Notice of Allowance dated Jun. 25, 2010 in copending U.S. Appl. No. 11/776,591.
USPTO Notice of Allowance dated Jun. 28, 2010 in copending U.S. Appl. No. 11/776,600.
USPTO Notice of Allowance dated Jun. 28, 2010 in copending U.S. Appl. No. 11/776,599.
USPTO Notice of Allowance dated Jul. 14, 2010 in copending U.S. Appl. No. 11/715,564.
USPTO Notice of Allowance dated Jul. 15, 2010 in copending U.S. Appl. No. 11/776,587.
USPTO Notice of Allowance dated Jul. 23, 2010 in copending U.S. Appl. No. 12/186,739.
USPTO Supplementary Notice of Allowance dated Sep. 21, 2010 in copending U.S. Appl. No. 11/715,564.

* cited by examiner

MULTI-LEVEL TUBULAR REACTOR WITH VERTICALLY SPACED SEGMENTS

BACKGROUND OF THE INVENTION

1. Field of the Invention

This invention relates to reactors for processing liquid-containing reaction mediums. In another aspect, the invention concerns polycondensation reactors used for melt-phase production of polyesters.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have led to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers exiting the esterification stage are converted into a polymer product having the desired final average chain length.

In many conventional melt-phase polyester production facilities, esterification and polycondensation are carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance.

Thus, a need exists for a high efficiency polyester process that minimizes capital, operational, and maintenance costs while maintaining or enhancing product quality.

SUMMARY OF THE INVENTION

In one embodiment of the present invention, there is provided a process comprising subjecting a reaction medium to a chemical reaction in a reactor comprising a vertically elongated header and a plurality of vertically spaced horizontally elongated reactor segments coupled to and extending outwardly from the header. The reaction medium flows through the header and the reactor segments as the reaction medium travels through the reactor. The reaction medium enters and exits at least one of the reactor segments through the header.

In another embodiment of the present invention, there is provided a process for making polyethylene terephthalate (PET), the process comprising: (a) introducing a polycondensation feed into a polycondensation reactor, wherein the polycondensation feed forms a reaction medium in the reactor, wherein the polycondensation feed comprises PET having an average chain length in the range of from about 5 to about 50; (b) subjecting the reaction medium to polycondensation in the reactor, wherein the reactor comprises a vertically elongated header and at least two horizontally elongated vertically spaced reactor segments coupled to and extending outwardly from the header, wherein the header provides fluid communication between the reactor segments, wherein the reaction medium passes downwardly through the header as the reaction medium travels from an upper one of the reactor segments to a lower one of the reactor segments, wherein the upper and lower reactor segments comprise respective upper and lower elongated pipes and respective upper and lower internal trays, wherein the upper and lower pipes and trays are substantially horizontally oriented, wherein the upper and lower pipes each have a length-to-diameter (L:D) ratio in the range of from about 2:1 to about 50:1, wherein the upper and lower trays each have a length of at least about 0.75 L relative to the upper and lower pipes respectively, wherein the reaction medium flows on the upper and lower trays generally away from the header, wherein the reaction medium flows on the bottom of the upper and lower pipes generally toward the header, wherein the reaction medium enters and exits at least one of the reactor segments through the header; and (c) recovering a predominately liquid polycondensation product from the reactor, wherein the polycondensation product comprises PET having an average chain length that is at least about 10 greater than the average chain length of the PET in the polycondensation feed.

In still another embodiment of the present invention, there is provided a reactor comprising a vertically elongated header and a plurality of vertically spaced horizontally elongated reactor segments coupled to and extending outwardly from the header. At least two of the reactor segments have a proximal end coupled to the header and a distal end spaced from the header. Each of the reactor segments comprises an elongated tubular member and a tray disposed substantially within the tubular member. The tray extends along at least one-half of the length of the tubular member and divides the interior of the tubular member into upper and lower chambers. The upper and lower chambers are in fluid communication with the header at the proximal end.

BRIEF DESCRIPTION OF THE DRAWINGS

Certain embodiments of the present invention are described in detail below with reference to the enclosed figures, wherein:

FIG. 1b is a top view of the alternative feed introduction system depicted in FIG. 1a;

FIG. 1c is a sectional end view of the alternative feed introduction system, taken along line 1c-1c in FIG. 1a.

DETAILED DESCRIPTION

Figure 1:
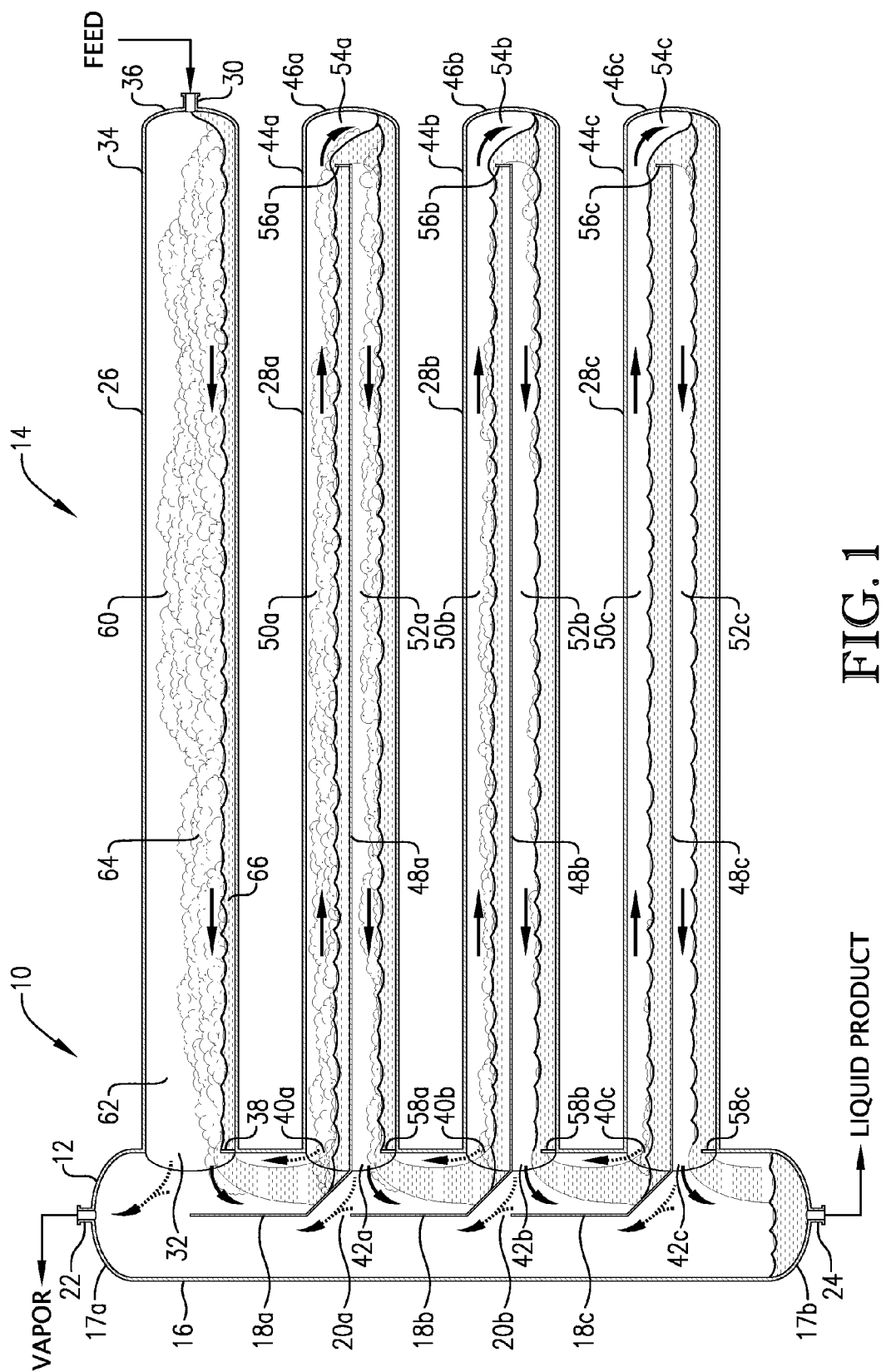
FIG. 1 is a schematic depiction of a multi-level tubular reactor configured in accordance with one embodiment of the present invention and suitable for use as a polycondensation reactor in a melt-phase polyester production facility.
Figure 2:
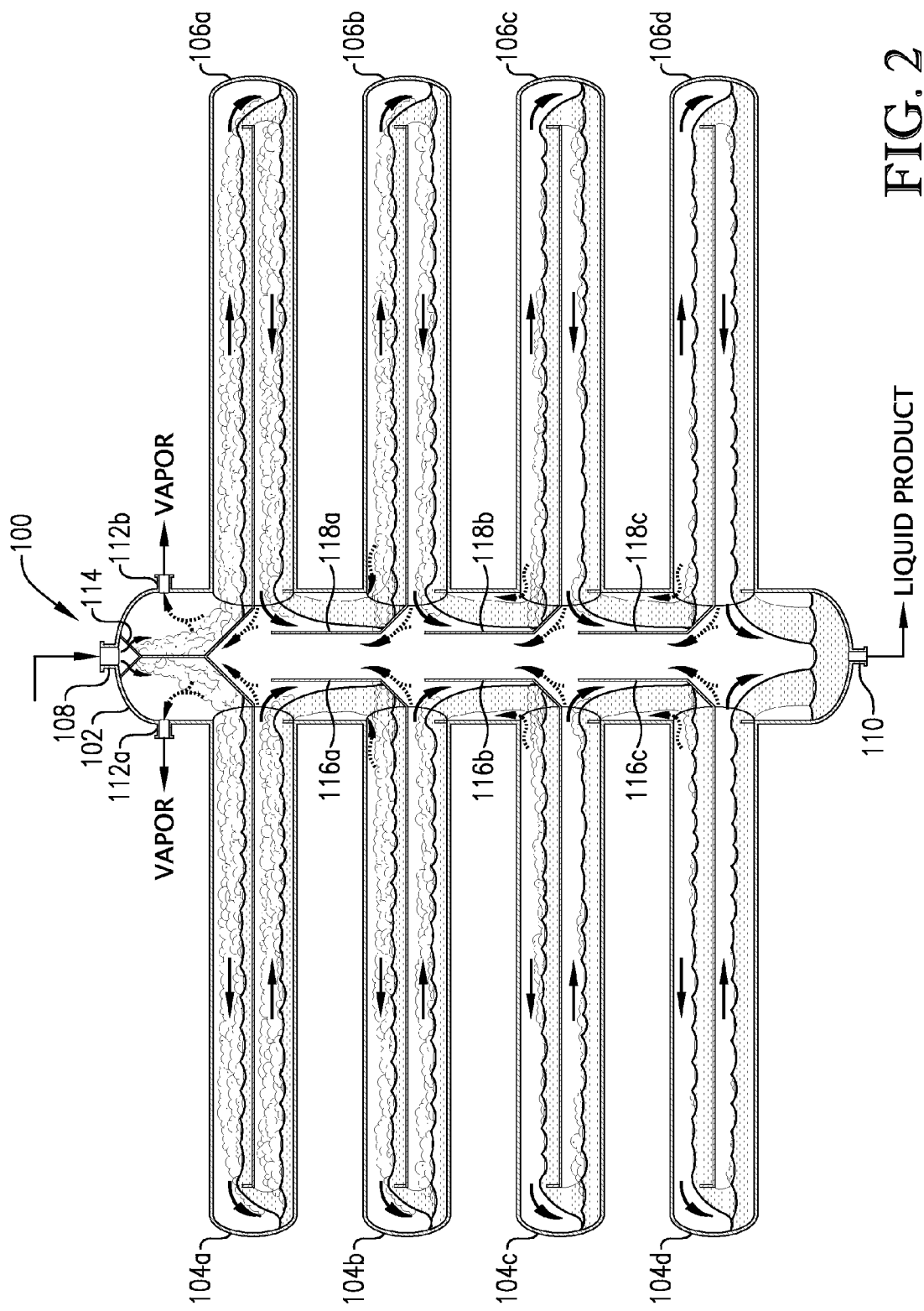
FIG. 2 is a schematic depiction of a multi-level tubular reactor configured in accordance with another embodiment of the present invention and suitable for use as a polycondensation reactor in a melt-phase polyester production facility.

FIGS. 1 and 2 illustrate exemplary multi-level tubular reactors configured in accordance with two embodiments of the present invention. The configuration and operation of the reactors depicted in FIGS. 1 and 2 are described in detail below. Although certain portions of the following description relate primarily to reactors employed in a melt-phase polyester production process, reactors configured in accordance with embodiments of the present invention may find application in a wide variety of chemical processes. For example, reactors configured in accordance with certain embodiments of the present invention may be advantageously employed in any process where chemical reactions take place in the liquid phase of a reaction medium and a vapor byproduct is produced as a result of the chemical reaction. Further, reactors configured in accordance with certain embodiments of the present invention may be advantageously employed in chemical processes where at least a portion of the reaction medium forms foam during processing.

Referring now to FIG. 1, one embodiment of a multi-level tubular reactor 10 is illustrated as generally comprising a vertically elongated header 12 and a group of horizontally elongated vertically spaced reactor segments 14 coupled to and extending outwardly from header 12.

Header 12 generally comprises an upright tubular shell 16, a pair of end caps 17a,b coupled to opposite ends of shell 16, and a plurality of flow diverters 18a,b,c disposed within the internal volume of header 12. A first vapor gap 20a is defined between flow diverters 18a and 18b, while a second vapor gap 20b is defined between flow diverters 18b and 18c. Header 12 defines a vapor outlet 22 in upper end cap 17a and a liquid product outlet 24 in lower end cap 17b. One side of header 12 defines a plurality of vertically spaced openings that provide fluid communication between the internal volume of header 12 and the group of reactor segments 14 coupled to the side of header 12.

In the embodiment illustrated in FIG. 1, shell 16 of header 12 is a substantially vertical, substantially cylindrical pipe. In an alternative embodiment, shell 16 can be a vertically elongated tubular member having a variety of cross-sectional configurations (e.g., rectangular, square, or oval). Further, shell 16 need not have a perfectly vertical orientation. For example, the central axis of elongation of shell 16 can extend within about 30, about 15, or 5 degrees of vertical.

In the embodiment illustrated in FIG. 1, header 12 has a maximum internal height (H) that is greater than its maximum internal width (W). In one embodiment, header 12 has a height-to-width (H:W) ratio in the range of from about 2:1 to about 20:1, about 4:1 to about 15:1, or 5:1 to 10:1. In one embodiment, H is in the range of from about 8 to about 100 feet, about 10 to about 75 feet, or 20 to 50 feet, and W is in the range of from about 1 to about 20 feet, about 2 to about 10 feet, or 3 to 5 feet.

In the embodiment illustrated in FIG. 1, the group of reactor segments 14 is directly coupled to and extends generally outwardly from a common side of header 12. The group of reactor segments 14 includes a trayless reactor segment 26, an uppermost trayed reactor segment 28a, an intermediate trayed reactor segment 28b, and a lowermost trayed reactor segment 28c. Each reactor segment 26 and 28a,b,c presents a proximal end coupled in fluid communication with header 12 and a distal end spaced from header 12.

Trayless reactor segment 26 defines a feed inlet 30 near the distal end thereof and an outlet 32 near the proximal end thereof. Trayless reactor segment 26 generally comprises a horizontally elongated tubular member 34 and an end cap 36. Tubular member 34 is coupled to header 12 near the proximal end of trayless reactor segment 26, while end cap 36 is coupled to tubular member 34 near the distal end of trayless reactor segment 26. A weir 38 can, optionally, be couple to and extend upwardly from the bottom of tubular member 34 near outlet 32 (as shown in FIG. 1) and/or multiple spaced-apart weirs (not shown) can be located along the length of tubular member 34.

Each trayed reactor segment 28a,b,c defines a respective reaction medium inlet 40a,b,c and a respective reaction medium outlet 42a,b,c. Inlets 40a,b,c and outlets 42a,b,c are located near the proximal end of reactor segments 28a,b,c and are in fluid communication with the internal volume of header 12. Each trayed reactor segment 28a,b,c generally comprises a horizontally elongated tubular member 44a,b,c, an end cap 46a,b,c, and a tray 48a,b,c. Tubular members 44a,b,c are each directly coupled to header 12 near the proximal end of reactor segments 28a,b,c. End caps 46a,b,c are coupled to tubular members 44a,b,c near the distal end of reactor segments 28a,b,c.

Trays 48a,b,c are disposed within respective tubular members 44a,b,c and extend along a substantial length of tubular members 44a,b,c. Each tray 48a,b,c presents a proximal end coupled to a respective flow diverter 18a,b,c and a distal end located near the distal end of reactor segments 28a,b,c. Each tray 48a,b,c can have a length that is at least about 0.5 L, about 0.75 L, or 0.9 L, where L is the maximum length of the reactor segment 28a,b,c and/or tubular member 44a,b,c within which the respective tray 48a,b,c is received.

Each tray 48a,b,c divides the internal volume of the respective reactor segment 28a,b,c into an upper chamber 50a,b,c and a lower chamber 52a,b,c. In the embodiment illustrated in FIG. 1, each tray 48a,b,c presents a substantially horizontal, substantially planar, upwardly facing flow surface across which liquids can flow. In order to provide sufficiently large upper and lower chambers 50a,b,c and 52a,b,c, the upwardly facing flow surface of each tray 48a,b,c can be spaced from the top and/or bottom of tubular members 44a,b,c by a vertical distance in the range of from about 0.1 D to about 0.9 D, about 0.2 D to about 0.8 D, or 0.4 D to 0.6 D, where D is the maximum vertical dimension of the tubular member 44a,b,c within which the respective tray 48,a,b,c is received.

The distal end of each tray 48a,b,c is spaced from end caps 46a,b,c so that a flow passageway 54a,b,c is defined by the gap between the distal end of each tray 48a,b,c and end caps 46a,b,c. The distal end of each tray 48a,b,c can, optionally, be equipped with an upwardly extending weir 56a,b,c. Each trayed reactor segment 28a,b,c can, optionally, be equipped with a weir 58a,b,c coupled to and extending upwardly from the bottom of tubular members 44a,b,c near outlets 42a,b,c.

In the embodiment illustrated in FIG. 1, tubular members 34 and 44a,c,b of each reactor segment 26 and 28a,b,c are substantially horizontal pipes, and trays 48a,b,c are substantially flat, substantially horizontal, substantially rectangular plates rigidly and sealingly coupled to the inside walls of the pipe. In an alternative embodiment, tubular members 34 and 44a,c,b of each reactor segment 26 and 28a,b,c can have a variety of cross-sectional shapes (e.g., rectangular, square, or oval). Further, tubular members 34 and 44a,c,b and trays 48a,b,c need not have a perfectly horizontal orientation. For example, the central axis of elongation of tubular members 34 and 44a,c,b can extend within about 30, about 15, or 5 degrees of horizontal. In addition, trays 48a,b,c can be supported in tubular members 44a,b,c using a variety of support mechanisms such as, for example, welding to both sidewalls of tubular members 44a,b,c, support legs extending from the bottom of tubular members 44a,b,c, or suspension from the top of tubular members 44a,b,c.

In the embodiment illustrated in FIG. 1, each reactor segment 26 and 28a,b,c and/or each tubular member 34 and 44a,b,c has a maximum internal length (L) that is greater than its maximum internal diameter (D). In one embodiment, each reactor segment 26 and 28a,b,c and/or each tubular member 34 and 44a,b,c has a length-to-diameter (L:D) ratio in the range of from about 2:1 to about 50:1, about 5:1 to about 20:1, or 8:1 to 15:1. In one embodiment, L is in the range of from about 10 to about 200 feet, about 20 to about 100 feet, or 30 to 50 feet, and D is in the range of from about 1 to about 20 feet, about 2 to about 10 feet, or 3 to 5 feet. In one embodiment, the ratio of the diameter (D) of one or more of reactor segments 26 and 28*a,b,c* to the maximum internal width of header (W) is in the range of from about 0.1:1 to about 2:1, about 0.25:1 to about 1:1, or 0.4:1 to 0.9:1. In the embodiment illustrated in FIG. 1, each trayed reactor segment 28*a,b,c* has a substantially identical configuration. In an alternative embodiment, reactor segments 28*a,b,c* can have different lengths, different diameters, and/or different orientations.

In the embodiment illustrated in FIG. 1, reactor 10 comprises one non-trayed reactor segment 26 and three trayed reactor segments 28*a,b,c*. However, it should be noted that the number and configuration of reactor segments can be optimized to match the application for which reactor 10 is employed. For example, reactor 10 could employ only trayed reactor segments (i.e., no non-trayed reactor segments). In such a configuration, the uppermost trayed reactor segment would define a feed inlet near the header. In another example, the reactor could employ one non-trayed reactor segment and two trayed reactor segments. In another example, the reactor could employ one non-trayed reactor segment and four trayed reactor segments. Although FIG. 1 illustrates feed inlet 30 as being located in end cap 36, in an alternative embodiment, the feed inlet can be defined in the side of tubular member 34 near, but spaced from, the distal end of non-trayed reactor segment 26.

Figure 1C:
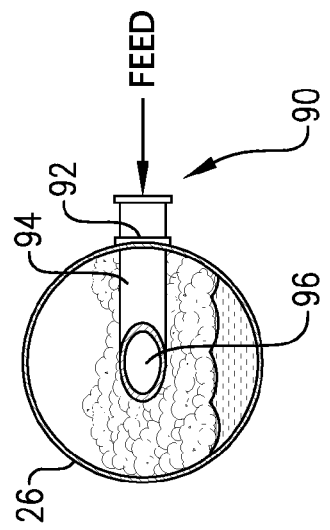
Figure 1B:
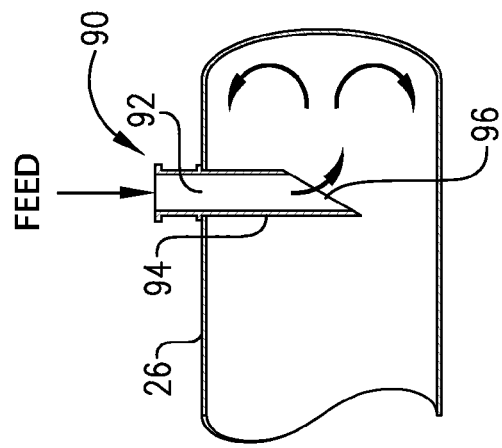
Figure 1A:
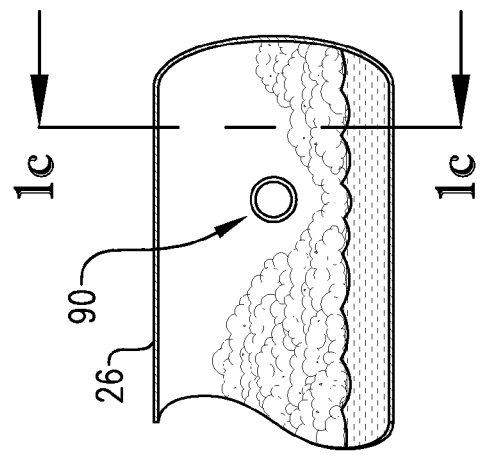
FIG. 1a is an enlarged side view depicting an alternative configuration for introducing a feed stream into the reactor of FIG. 1.

FIGS. 1*a-c* illustrate an alternative feed introduction system 90 that introduces the reactor feed through the side of reactor segment 26. As perhaps best illustrated in the top view of FIG. 1*b* and the end view of FIG. 1*c*, side feed introduction system 90 includes an inlet opening 92 defined in the side of reactor segment 26, an internal feed distributor 94 extending into reactor segment 26, and a discharge opening 96 defined by feed distributor 94. In the embodiment illustrated in FIGS. 1*a-c*, feed distributor 94 is a substantially cylindrical conduit that is fixed to the sidewall of reactor segment 26 at inlet opening 92. The distal end of feed distributor 94 defines discharge opening 96 at a location spaced from the side walls and the end of reactor segment 26. As shown in FIGS. 1*b* and 1*c*, discharge opening 96 can be formed by cutting the distal end of feed distributor 94 at a skewed angle so that discharge opening 96 faces at least partially towards the closed end of reactor segment 26. The location and orientation of discharge opening 96 can increase liquid circulation and help reduce or eliminate stagnant zones near the end of reactor segment 26.

Referring again to FIG. 1, in operation, a feed, which can be in a predominately liquid form, is introduced into reactor 10 via feed inlet 30 of non-trayed reactor segment 26. In non-trayed reactor segment 26, the feed forms a reaction medium 60 that flows generally horizontally on the bottom of tubular member 34 from the distal end of non-trayed reactor segment 26 to the proximal end of non-trayed reactor segment 26. As reaction medium 60 flows through non-trayed reactor segment 26, a chemical reaction takes place within reaction medium 60. A vapor 62 can be formed in non-trayed reactor segment 26. Vapor 62 can comprise a byproduct of the chemical reaction carried out in reactor segment 26 and/or a volatile component of the feed to reactor segment 26. At least a portion of vapor 62 is disengaged from and flows generally over reaction medium 60 as reaction medium 60 flows through non-trayed reactor segment 26.

As depicted in FIG. 1, in one embodiment of the present invention, the chemical reaction carried out in reactor 10 causes foaming of reaction medium 60, thereby producing a foam portion 64 and a predominately liquid portion 66 of reaction medium 60. The chemical reaction can take place in the liquid of both foam portion 64 and predominately liquid portion 66. In fact, the presence of foam can actually enhance certain chemical reactions, especially those reactions that are facilitated by increased liquid surface area and reduced pressure. Thus, in one embodiment of the present invention, the internal volume and open flow area of the reactor segments are sufficiently large so that the maximum amount of foam formation is permitted. In applications where large amounts of foaming occur throughout a substantial portion of the reactor, it may be desired to have two or more initial non-trayed reactor segments and fewer trayed reactor segments in order to provide sufficient space within the reactor segments for maximum foam formation. Alternatively, larger trayed reactor segments can be employed to provide the necessary volume and open flow area to promote foam formation. As illustrated in FIGS. 1 and 2, the amount of foam produced by the reaction may decrease as the reaction progresses through the reactor. Thus, the reaction medium 60 in the initial reactor segment may comprise more than 50, 75, or 90 volume percent gas, while the reaction medium 60 in the final reactor segment may comprise less than 20, 10, or 5 volume percent gas.

Referring again to FIG. 1, after flowing through non-trayed reactor segment 26, reaction medium 60 passes out of non-trayed reactor segment 26 via outlet 32. If weir 38 is employed, reaction medium 60 flows over the top of, around the edges of, through openings in, and/or under weir 38 as it exits non-trayed reactor segment 26 and enters the internal volume of header 12. As reaction medium 60 passes out of non-trayed reactor segment 26 and flows downwardly into header 12, vapor 62 flows upwardly into header 12. In header 12, vapor 62 from non-trayed reactor segment 26 can be combined with the vapor produced in trayed reactor segments 28*a,b,c*. The resulting combined vapor can exit header 12 via vapor outlet 22. Upon exiting non-trayed reactor segment 26, reaction medium 60 flows downwardly in header 12 and is directed by flow diverter 18*a* to inlet 40*a* of uppermost trayed reactor segment 28*a*.

In uppermost trayed reactor segment 28*a*, reaction medium 60 flows generally horizontally across the upwardly facing surface of tray 48*a* and towards the distal end of reactor segment 28*a*. As discussed above, reaction medium 60 is subjected to chemical reaction in reactor segment 28*a*, and the chemical reaction can cause the formation of a vapor byproduct and/or foam as reaction medium 60 flows across tray 48*a*. When a vapor is produced by reaction medium 60 flowing on tray 48*a*, the vapor can flow in upper chamber 50*a* countercurrent to the direction of flow of reaction medium 60 in upper chamber 50*a*. The vapor can exit upper chamber 50*a* out through inlet 40*a* as reaction medium 60 enters upper chamber 50*a* through inlet 40*a*.

When reaction medium 60 reaches the terminal end of tray 48*a*, it falls downwardly through flow passageway 54*a* and onto the bottom of tubular member 44*a*. When the terminal end of tray 48*a* is equipped with weir 56*a*, reaction medium 60 flows over the top of, around the edges of, through openings in, and/or under weir 56*a* prior to entering flow passageway 54*a*. Reaction medium 60 then flows on the bottom of tubular member 44*a* from the distal end of reactor segment 28*a* to the proximal end of reactor segment 28*a*. When reaction medium 60 reaches the proximal end of reactor segment 28*a*, it exits reactor segment 28*a* via outlet 42*a* and enters header 12. When a vapor is produced in lower chamber 52*a*, the vapor flows generally over reaction medium 60 and exits lower chamber 52*a* along with reaction medium 60 via outlet 42*a*. When weir 58*a* is provided at outlet 42*a*, at least a portion of reaction medium 60 flows over the top of, around the edges of, through openings in, and/or under weir 58*a*.

Weirs 38, 56*a,b,c*, and 58*a,b,c* can be employed in reactor 10 to help maintain the desired depth of reaction medium 60 in reactor segments 26 and 28*a,b,c*. In one embodiment of the present invention, the maximum depth of reaction medium 60 in each reactor segment 26 and 28*a,b,c* is less than about 0.8 D, less than about 0.4 D, or less than 0.25 D, where D is the maximum vertical dimension of the respective reactor segment 26 and 28 *a,b,c*.

As reaction medium 60 passes out of uppermost trayed reactor segment 28*a* and flows downwardly in header 12, the vapor produced in trayed reactor segment 28*a* flows upwardly into header 12. The vapor exiting lower chamber 52*a* of reactor segment 28*a* can pass through a vapor gap 20*a* defined by flow diverter 18*b* or between flow diverters 18*a* and 18*b*. As mentioned above, the vapor produced in reactor segment 28*a* can be combined in header 12 with the vapor produced in non-trayed reactor segment 26 and trayed reactor segments 28*b,c*. The resulting combined vapor exits header 12 via vapor outlet 22. Upon exiting trayed reactor segment 28*a*, reaction medium 60 flows downwardly in header 12 and is directed by flow diverter 18*b* to inlet 40*b* of intermediate trayed reactor segment 28*b*.

The flow of reaction medium 60 through the intermediate and lowermost trayed reactors segments 28*b* and 28*c* can proceed substantially the same as describe above with reference to flow through uppermost trayed reactor segment 28*a*. In summary, reaction medium 60 proceeds through trayed reactor segments 28*a,b,c* as follows: (a) reaction medium 60 is directed from header 12 to trayed reactor segments 28*a,b,c* by flow diverters 18*a,b,c*; (b) reaction medium 60 enters trayed reactor segments 28*a,b,c* via inlets 40*a,b,c*; (c) reaction medium 60 flows generally away from header 12 on trays 48*a,b,c*; (d) reaction medium 60 falls downwardly over a terminal end of trays 48*a,b,c* and onto the bottom of tubular members 44*a,b,c*; (e) reaction medium 60 flows back toward header 12 on the bottom of tubular members 44*a,b,c*; (e) reaction medium 60 exits trayed reactor segments 28*a,b,c* via outlets 42*a,b,c*; and (f) reaction medium 60 falls downwardly in header 12 to the next level of processing.

The reaction medium 60 exiting lowermost trayed reactor segment 28*c* flows into header 12 and collects in the bottom thereof. This final reaction medium 60 is withdrawn from header 12 as a predominately liquid product via liquid product outlet 24.

Although not illustrated in FIG. 1, impingement plates can be employed in header 12 near one or more of vapor outlet 22, non-trayed reactor segment outlet 32, and trayed reactor segment outlets 42*a,b,c*. Such impingement plates can be located in the vapor flow paths so that liquid entrained in the flowing vapor hits, collects on, and falls downwardly off of the impingement plates. This helps ensure that only vapor exits vapor outlet 22 of header 12.

Referring now to FIG. 2, a second embodiment of a multi-level tubular reactor 100 is illustrated as generally comprising a header 102, a first set of trayed reactor segments 104*a,b,c,d*, and a second set of trayed reactor segments 106*a,b,c,d*. In the configuration illustrated in FIG. 2, first and second sets of reactor segments 104*a,b,c,d* and 106*a,b,c,d* extend outwardly from generally opposite sides of header 102. However, in an alternative embodiment, the sets of reactor segments can extend from different sides of header 102 that are not necessarily opposite. For example, the two sets of reactor segments could extend outwardly from the header at a 45°, 60°, 75°, 90°, 105°, 130°, 145°, or 160° angle relative to one another. In another example, reactor 100 could employ three sets of reactor segments circumferentially spaced around header 102 at 120° angles relative to one another.

Referring again to FIG. 2, header 102 defines a feed inlet 108 for receiving a feed, which can be in a predominately liquid form, a product outlet 110 for discharging a predominately liquid product, and a pair of vapor outlets 112*a,b* for discharging a vapor. Header 102 generally comprises a flow splitter 114, a first set of flow diverters 116*a,b,c*, and a second set of flow diverters 118*a,b,c*. First and second sets of reactor segments 104*a,b,c,d* and 106*a,b,c,d* can have substantially the same configuration as the trayed reactor segments described above with reference to FIG. 1. Thus, the specific configuration and operational details of trayed reactor segments 104*a,b,c,d* and 106*a,b,c,d* will not be re-described.

In operation, reactor 100 receives a feed, which can be in a predominately liquid form, via feed inlet 108. Flow splitter 114 splits the feed into two substantially equal portions. Flow splitter 114 then directs one of the portions to the internal tray of uppermost first reactor segment 104*a*, and the other portion to the internal tray of uppermost second reactor segment 106*a*. Once the split feed portions enter the trayed reactor segments, flow through the trayed reactor segments can proceed in substantially the same manner as described above with respect for FIG. 1, with the reaction medium following a flow path that includes an outward portion (i.e., flow away from the header on the internal tray), a downward portion (i.e., flow from the tray to the bottom of the tubular member), and an inward portion (i.e., flow back toward the header on the bottom of the tubular member). After flowing through each reactor segment, the reaction medium is then directed through the header by the flow diverters to the next lower reactor segment. Referring again to FIG. 2, when the reaction medium exits lowermost reactor segments 104*d* and 106*d*, the two portions of the reaction medium combine to form the predominately liquid product, which is withdrawn from header 102 via liquid product outlet 110.

Multi-level tubular reactors configured in accordance with certain embodiments of the present invention require little or no mechanical agitation of the reaction medium processed therein. Although the reaction medium processed in the multi-level tubular reactor may be somewhat agitated by virtue of foaming, flowing through the reactor segments, and falling from one reactor segment to another, this foaming agitation, flow agitation, and gravitational agitation is not mechanical agitation. In one embodiment of the present invention, less than about 50 percent, less than about 25 percent, less than about 10 percent, less than about 5 percent, or 0 percent of the total agitation of the reaction medium processed in the multi-level tubular reactor is provided by mechanical agitation. Thus, reactors configured in accordance with certain embodiments of the present invention can operate without any mechanical mixing devices. This is in direct contrast to conventional continuous stirred tank reactors (CSTRs) which employ mechanical agitation almost exclusively.

As indicated above, multi-level tubular reactors configured in accordance with embodiments of the present invention reactors can be used in a variety of chemical processes. In one embodiment, a multi-level tubular reactor configured in accordance with the present invention is employed in a melt-phase polyester production facility capable of producing any of a variety of polyesters from a variety of starting materials. Examples of melt-phase polyesters that can be produced in accordance with embodiments of the present invention include, but are not limited to, polyethylene terephthalate (PET), which includes homopolymers and copolymers of PET; fully aromatic or liquid crystalline polyesters; biodegradable polyesters, such as those comprising butanediol, terephthalic acid and adipic acid residues; poly(cyclohexanedimethylene terephthalate) homopolymer and copolymers; and homopolymers and copolymers of 1,4-cyclohexane-dimethanol (CHDM) and cyclohexane dicarboxylic acid or dimethyl cyclohexanedicarboxylate. When a PET copolymer is produced, such copolymer can comprise at least 90, at least 91, at least 92, at least 93, at least 94, at least 95, at least 96, at least 97, at least 98 mole percent of ethylene terephthalate repeat units and up to 10, up to 9, up to 8, up to 7, up to 6, up to 5, up to 4, up to 3, or up to 2 mole percent of added comonomer repeat units. Generally, the comonomer repeat units can be derived from one or more comonomers selected from the group consisting of isophthalic acid, 2,6-naphthaline-dicarboxylic acid, CHDM, and diethylene glycol.

In general, a polyester production process according to certain embodiments of the present invention can comprise two main stages—an esterification stage and a polycondensation stage. In the esterification stage, the polyester starting materials, which can comprise at least one alcohol and at least one acid, are subjected to esterification to thereby produce polyester monomers and/or oligomers. In the polycondensation stage, the polyester monomers and/or oligomers from the esterification stage are reacted into the final polyester product. As used herein with respect to PET, monomers have less than 3 chain lengths, oligomers have from about 7 to about 50 chain lengths (components with a chain length of 4 to 6 units can be considered monomer or oligomer), and polymers have greater than about 50 chain lengths. A dimer, for example, EG-TA-EG-TA-EG, has a chain length of 2, and a trimer 3, and so on.

The acid starting material employed in the esterification stage can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material employed in the esterification stage can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethyl propane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxy-ethoxyphenyl)-propane, 2,2-bis-(4-hydroxy-propoxyphenyl)-propane, isosorbide, hydroquinone, BDS-(2,2-(sulfonylbis)4,1-phenyleneoxy))bis(ethanol), and mixtures thereof.

In addition, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

Both the esterification stage and the polycondensation stage of a melt-phase polyester production process can include multiple steps. For example, the esterification stage can include an initial esterification step for producing a partially esterified product that is then further esterified in a secondary esterification step. Also, the polycondensation stage can include a prepolymerization step for producing a partially condensed product that is then subjected to a finishing step to thereby produce the final polymer product.

Reactors configured in accordance with certain embodiments of the present invention can be employed in a melt-phase polyester production system as a secondary esterification reactor for carrying out a secondary esterification step, as a prepolymer reactor for carrying out a prepolymerization step, and/or as a finisher reactor for carrying out a finishing step. A detailed description of the process conditions for the present invention employed as an esterification reactor, a prepolymer reactor, and/or a finisher reactor is given below with reference to FIG. 1. It is understood that reactors configured in accordance with embodiments of the present invention can generally be employed as esterification reactors, prepolymer reactors, and/or finisher reactors and that these process conditions are not limited to the embodiment described in FIG. 1, Referring again to FIG. 1, when reactor 10 is employed as a secondary esterification reactor in a melt-phase polyester production process (e.g., a process for making PET), more than one chemical reaction can be carried out in reactor 10. For example, although esterification may be the primary chemical reaction carried out in reactor 10, a certain amount of polycondensation may also occur in reactor 10. When reactor 10 is employed as a secondary esterification reactor, the feed introduced into feed inlet 30 of reactor segment 26 can have a conversion in the range of from about 70 to about 95 percent, about 75 to about 90 percent, or 80 to 88 percent, while the predominately liquid product withdrawn from liquid product outlet 24 of header 12 can have a conversion of at least about 80 percent, at least about 90 percent, at least about 95 percent, or at least 98 percent. When reactor 10 is employed as a secondary esterification reactor, the chemical reaction(s) carried out in reactor 10 can increase the conversion of reaction medium 60 by at least about 2 percentage points, at least about 5 percentage points, or at least 10 percentage points between feed inlet 30 and liquid product outlet 24. Further, the average chain length of the feed introduced into feed inlet 30 can be less than about 5, less than about 2 or less than 1, while the predominately liquid product withdrawn from liquid product outlet 24 can have an average chain length in the range of from about 1 to about 20, about 2 to about 12, or 5 to 12. Generally, when reactor 10 is employed as a secondary esterification reactor, the average chain length of reaction medium 60 can increase in the range of from about 1 to about 20, about 2 to about 15, or 5 to 12 between feed inlet 30 and liquid product outlet 24.

When reactor 10 is employed as a secondary esterification reactor, the feed to reactor 10 can enter feed inlet 30 at a temperature in the range of from about 180 to about 350° C., about 215 to about 305° C., or 260 to 290° C. The predominately liquid product exiting liquid product outlet 24 can have a temperature within about 50° C., 25° C., or 10° C. of the temperature of the feed entering feed inlet 30. In one embodiment, the temperature of the liquid product exiting liquid product outlet 24 can be in the range of from about 180 to about 350° C., about 215 to about 305° C., or 260 to 290° C. In one embodiment, the average temperature of reaction medium 60 in reactor 10 is in the range of from about 180 to about 350° C., about 215 to about 305° C., or 260 to 290° C. The average temperature of reaction medium 60 is the average of at least three temperature measurements taken at equal spacings along the primary flow path of reaction medium 60 through reactor 10, where the temperature measurements are each taken near the cross sectional centroid of predominately liquid portion 66 of reaction medium 60 (as opposed to near the wall of the reactor or near the upper surface of the predominately liquid portion). When reactor 10 is employed as a secondary esterification reactor, the vapor space pressure in reactor 10 (measured at vapor outlet 22) can be maintained at less than about 70 psig, in the range of from about −4 to about 10 psig, or in the range of from 2 to 5 psig.

When reactor 10 is employed as a secondary esterification reactor, it may be desirable to heat the feed prior to introduction into reactor 10 and/or it may be desirable to heat reaction medium 60 as it flows through reactor 10. The heating of the feed prior to introduction into reactor 10 can be carried out in a conventional heat exchanger such as, for example, a shell-and-tube heat exchanger. The heating of reaction medium 60 in reactor 10 can be carried out by external heating devices that contact reactor 10, but do not extend into the interior of reactor 10. Such external heat exchange devices include, for example, jacketing and/or heat-tracing. Generally, the cumulative amount of heat added to the feed immediately upstream of reactor 10 plus the heat added to reaction medium 60 in reactor 10 can be in the range of from about 100 to about 5,000 BTU per pound of reaction medium (BTU/lb), in the range of from about 400 to about 2,000 BTU/lb, or in the range of from 600 to 1,500 BTU/lb.

Referring again to FIG. 1, when reactor 10 is employed as a prepolymer reactor in a melt-phase polyester production process (e.g., a process for making PET), more than one chemical reaction can be carried out in reactor 10. For example, although polycondensation may be the predominate chemical reaction carried out in reactor 10, a certain amount of esterification may also occur in reactor 10. When reactor 10 is employed as a prepolymer reactor, the average chain length of the feed introduced into feed inlet 30 can be in the range of from about 1 to about 20, about 2 to about 15, or 5 to 12, while the average chain length of the predominately liquid product withdrawn from liquid product outlet 24 can be in the range of from about 5 to about 50, about 8 to about 40, or 10 to 30. When reactor 10 is employed as a prepolymerization reactor, the chemical reaction carried out in reactor 10 can cause the average chain length of reaction medium 60 to increase by at least about 2, in the range of from about 5 to about 30, or in the range of from 8 to 20 between feed inlet 30 and liquid product outlet 24.

When reactor 10 is employed as a prepolymer reactor, the feed can enter feed inlet 30 at a temperature in the range of from about 220 to about 350° C., about 265 to about 305° C., or 270 to 290° C. The predominately liquid product exiting liquid product outlet 24 can have a temperature within about 50° C., 25° C., or 10° C. of the temperature of the feed entering feed inlet 30. In one embodiment, the temperature of the liquid product exiting liquid product outlet 24 is in the range of from about 220 to about 350° C., about 265 to about 305° C., or 270 to 290° C. In one embodiment, the average temperature of reaction medium 60 in reactor 10 is in the range of from about 220 to about 350° C., about 265 to about 305° C., or 270 to 290° C. When reactor 10 is employed as a prepolymer reactor, the vapor space pressure in reactor 10 (measured at vapor outlet 22) can be maintained in the range of from about 0 to about 300 torr, in the range of from about 1 to about 50 torr, or in the range of from 20 to 30 torr.

When reactor 10 is employed as a prepolymer reactor, it may be desirable to heat the feed prior to introduction into reactor 10 and/or it may be desirable to heat reaction medium 60 as it flows through reactor 10. Generally, the cumulative amount of heat added to the feed immediately upstream of reactor 10 plus the heat added to reaction medium 60 in reactor 10 can be in the range of from about 100 to about 5,000 BTU/lb, in the range of from about 400 to about 2,000 BTU/lb, or in the range of from 600 to 1,500 BTU/lb.

Referring again to FIG. 1, when reactor 10 is employed as a finisher reactor in a melt-phase polyester production process (e.g., a process for making PET), the average chain length of the feed introduced into feed inlet 30 can be in the range of from about 5 to about 50, about 8 to about 40, or 10 to 30, while the average chain length of the predominately liquid product withdrawn from liquid product outlet 24 can be in the range of from about 30 to about 210, about 40 to about 80, or 50 to 70. Generally, the polycondensation carried out in reactor 10 can cause the average chain length of reaction medium 60 to increase by at least about 10, at least about 25, or at least 50 between feed inlet 30 and liquid product outlet 24.

When reactor 10 is employed as a finisher reactor, the feed can enter feed inlet 30 at a temperature in the range of from about 220 to about 350° C., about 265 to about 305° C., or 270 to 290° C. The predominately liquid product exiting liquid product outlet 24 can have a temperature within about 50° C., 25° C., or 10° C. of the temperature of the feed entering feed inlet 30. In one embodiment, the temperature of the liquid product exiting liquid product outlet 24 is in the range of from about 220 to about 350° C., about 265 to about 305° C., or 270 to 290° C. In one embodiment, the average temperature of reaction medium 60 in reactor 10 is in the range of from about 220 to about 350° C., about 265 to about 305° C., or 270 to 290° C. When reactor 10 is employed as a finisher reactor, the vapor space pressure in reactor 10 (measured at vapor outlet 22) can be maintained in the range of from about 0 to about 30 torr, in the range of from about 1 to about 20 torr, or in the range of from 2 to 10 torr.

Reactors configured in accordance with embodiments of the present invention can provide numerous advantages when employed as reactors in the esterification and/or polycondensation stages of a polyester production process. Such reactors can be particularly advantageous when employed as secondary esterification, prepolymer, and/or finisher reactors in a process for making PET. Further, such reactors are well suited for use in commercial scale PET production facilities capable of producing PET at a rate of at least about 10,000 pounds per hours, at least about 100,000 pounds per hour, at least about 250,000 pounds per hour, or at least 500,000 pounds per hour.

In one embodiment of the present invention, there is provided a process comprising subjecting a reaction medium to a chemical reaction in a reactor comprising a vertically elongated header and a plurality of vertically spaced horizontally elongated reactor segments coupled to and extending outwardly from the header. The reaction medium flows through the header and the reactor segments as the reaction medium travels through the reactor. The reaction medium enters and exits at least one of the reactor segments through the header. In another example, the reaction medium enters and exits at least one, at least two, at least three, or at least 4 of the reactor segments only through the header.

The reactor can, for example, comprise at least two, at least three, at least four, at least five, at least six, at least seven, or more vertically spaced horizontally elongated reactor segments. All of the reactor segments can extend outwardly from a common side of the header or at least two of the reactor segments can extend outwardly from different sides of the header. For example, the reactor can comprise at least three, at least four, at least five, at least six, at least seven, or more reactor segments extending outwardly from a common side of the header. In another example, the reactor can comprise a first set of at least two reactor segments and a second set of at least two reactor segments, wherein the first and second sets of reactor segments extend outwardly from generally opposite sides of the header.

In one example, the header extends substantially vertically (i.e., the central axis of elongation for the header is essentially vertical). Alternatively, the header can extend within about 30, about 15, or 5 degrees of vertical. In one example, the reactor segments extend essentially horizontally (i.e., the central axis of elongation of the reactor segments is essentially horizontal). Alternatively the reactor segments can extend within about 30, about 15, or 5 degrees of horizontal. In another example, the reactor comprises no mechanical mixing device.

In one example of the present invention, the reaction medium flows through at least one of the reactor segments along a flow path that includes an outward portion where the reaction medium flows generally away from the header and an inward portion where the reaction medium flows generally towards the header. The outward and inward portions of the flow path can each extend at least one-half, or at least three-quarters, or at least nine-tenths the length of the at least one of the reactor segments.

In another example, at least one of the reactor segments comprises a substantially horizontal pipe and at least one tray disposed in the pipe, wherein at least a portion of the reaction medium flows on the tray as the reaction medium flows through the at least one of the reactor segments. In another example, at least one of the reactor segments comprises a horizontally elongated tubular member and a tray disposed substantially within the tubular member, wherein the tray extends along at least one-half, at least three-quarters, or at least nine-tenths the length of the tubular member. The reaction medium flows on the tray when traveling along the outward portion of the flow path and on the bottom of the tubular member when traveling along the inward portion of the flow path. In another example, the at least one of the reactor segments receives the reaction medium onto the tray from the header and discharges the reaction medium into the header from the bottom of the tubular member. In another example, the at least one of the reactor segments also discharges a vapor byproduct of the chemical reaction into the header. The discharged vapor byproduct flows generally upwardly in the header while the discharged reaction medium flows generally downwardly in the header.

In one example, the reaction medium flows from a proximal end of the tray to a distal end of the tray when traveling along the outward flow path and flows over the distal end of the tray and onto the bottom of the tubular member. In one example, the distal end of the tray comprises an upwardly extending weir over, around, through, and/or under which at least a portion of the reaction medium flows before passing to the bottom of the tubular member. In another example, the at least one of the reactor segments comprises an end cap coupled to a distal end of the tubular member, wherein the distal end of the tray is horizontally spaced from the end cap to thereby form a flow passageway through which the reaction medium flows as it passes from the tray to the bottom of the tubular member. In one example, the tubular member and the tray are substantially horizontally oriented. In another example, the central axis of elongation for the tubular member can extend within about 30, about 15, or about 5 degrees of horizontal. In one example, the tubular member is a pipe.

In one example, at least one of the reactor segments has a length-to-diameter (L:D) ratio in the range of from about 2:1 to about 50:1, about 5:1 to about 20:1, or 8:1 to 15:1. In another example, additionally L is in the range of from about 10 to about 200 feet, about 20 to about 100 feet or 30 to 50 feet and D is in the range of from about 1 to about 20 feet, about 2 to about 10 feet, or 3 to 5 feet.

In one example, as the reaction medium travels through the reactor, the reaction medium flows downwardly through the header as the reaction medium travels from an upper one to a lower one of the reactor segments. In one example, the upper and lower reactor segments comprise respective upper and lower elongated tubular members and upper and lower internal trays disposed in the upper and lower tubular members respectively, wherein at least a portion of the reaction medium flows generally away from the header on the upper and lower trays and generally towards the header on the bottom of the upper and lower tubular members. In another example, the reactor further comprises upper and lower flow diverters coupled to the upper and lower trays respectively, wherein the upper and lower flow diverters extend into the header and the lower flow diverter directs the reaction medium exiting the bottom of the upper tubular member downwardly through the header and onto the lower tray. Additionally, a vapor gap can be defined by the lower flow diverter or between the upper and lower flow diverters, wherein the vapor gap permits the flow of a vapor byproduct of the chemical reaction out of the lower reactor segment and generally upwardly through the header while the reaction medium exiting the upper reactor segment is directed generally downwardly through the header.

In one example, a vapor byproduct of the chemical reaction from at least two of the reactor segments is combined in the header and exits the reactor via a vapor outlet located near the top of the header. In another example, a predominately liquid product of the chemical reaction exits the reactor via a liquid outlet located near the bottom of the header.

In one example, the header has a height-to-width (H:W) ratio in the range of from about 2:1 to about 20:1, about 4:1 to about 15:1, or 5:1 to 10:1 and at least one of the reactor segments has an L:D ratio in the range of from about 2:1 to about 50:1, about 5:1 to about 20:1, or 8:1 to 15:1.

In one example, the reaction medium comprises a liquid within which the chemical reaction is carried out. In another example the reaction medium comprises a foam portion and a predominately liquid portion, each comprising the liquid. In one example, a portion of the reaction medium located in an uppermost one of the reactor segments comprises at least 50 volume percent vapor and a portion of the reaction medium located in a lowermost one of the reactor segments comprises less than 20 volume percent vapor.

In one example, the chemical reaction comprises polycondensation, wherein the average chain length of the reaction medium increases by at least about 10, at least about 25, or at least 50 in the reactor. In one example, the reaction medium can comprise a polyester polymer or copolymer that is at least partly formed by the polycondensation. The polyester polymer or copolymer can comprise polyethylene terephthalate (PET). Additionally, the process can comprise introducing a polycondensation feed into the feed inlet of the reactor, wherein the polycondensation feed forms the reaction medium in the reactor. The polycondensation feed can have an average chain length in the range of from about 5 to about 50, about 8 to about 40, or 10 to 30.

In one example of the present invention, there is provided a process comprising subjecting a reaction medium to an esterification and/or polycondensation reaction in a reactor comprising a vertically elongated header and a plurality of vertically spaced horizontally elongated reactor segments coupled to and extending outwardly from the header. The reaction medium flows through the header and the reactor segments as the reaction medium travels through the reactor. The reaction medium enters and exits at least one of the reactor segments through the header. The detailed description of FIG. 1 reactor 10 employed as a second stage esterification, prepolymerization, and/or finisher reactor given above applies to this example of the present invention. Specifically the feed characteristics (e.g., conversion and/or chain length), temperature, pressure, conversion increase, average chain length increase, product characteristics, and any heat input all apply to this example of the present invention.

In one example, a product is removed from a product outlet of the reactor, wherein the reaction medium forms the product in the reactor. Additionally, when the chemical reaction comprises polycondensation, the product can be a polycondensation product. The It.V. of the product or polycondensation product can be in the range of from about 0.3 to about 1.2, about 0.35 to about 0.6, or 0.4 to 0.5 dL/g. In one example, It.V. of the product or polycondensation product is in the range of from about 0.1 to about 0.5, about 0.1 to about 0.4, or 0.15 to 0.35 dL/g. In one example, a feed is introduced to a feed inlet of the reactor to form the reaction medium and the It.V. of the feed is in the range of from about 0.1 to about 0.5, about 0.1 to about 0.4, or 0.15 to 0.35 dL/g.

The Intrinsic viscosity (It.V.) values are set forth in dL/g units as calculated from the inherent viscosity measured at 25° C. in 60% phenol and 40% 1,1,2,2-tetrachloroethane by weight. Polymer samples can be dissolved in the solvent at a concentration of 0.25 g/50 mL. The viscosity of the polymer solutions can be determined, for example, using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.5 g/100 mL of 60% phenol and 40% 1,1,2,2-tetrachloroethane by weight ln=Natural logarithm $t_s$=Sample flow time through a capillary tube $t_o$=Solvent-blank flow time through a capillary tube C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} (\ln\eta_r)/C$$

where $\eta_{int}$=Intrinsic viscosity $\eta_r$=Relative viscosity=$t_s/t_o$ $\eta_{sp}$=Specific viscosity=$\eta_r-1$ The intrinsic viscosity (It.V. or $\eta_{int}$) may be estimated using the Billmeyer equation as follows:

$$\eta_{int} = 0.5[e^{0.5 \times Ih.V.} - 1] + (0.75 \times Ih.V.)$$

The reference for estimating intrinsic viscosity (Billmeyer relationship) is J. *Polymer Sci.*, 4, pp. 83-86 (1949).

The viscosity of the polymer solutions can also be determined using a Viscotek Modified Differential Viscometer (a description of the operating principle of the differential pressure viscometers can be found in ASTM D 5225) or other methods known to one skilled in the art.

In another embodiment of the present invention, there is provided a process for making polyethylene terephthalate (PET), the process comprising: (a) introducing a polycondensation feed into a polycondensation reactor, wherein the polycondensation feed forms a reaction medium in the reactor, wherein the polycondensation feed comprises PET having an average chain length in the range of from about 5 to about 50, about 8 to about 40, or 10 to 30; (b) subjecting the reaction medium to polycondensation in the reactor, wherein the reactor comprises a vertically elongated header and at least two horizontally elongated vertically spaced reactor segments coupled to and extending outwardly from the header, wherein the header provides fluid communication between the reactor segments, wherein the reaction medium passes downwardly through the header as the reaction medium travels from an upper one of the reactor segments to a lower one of the reactor segments, wherein the upper and lower reactor segments comprise respective upper and lower elongated pipes and respective upper and lower internal trays, wherein the upper and lower pipes and trays are substantially horizontally oriented, wherein the upper and lower pipes each have a length-to-diameter (L:D) ratio in the range of from about 2:1 to about 50:1, about 5:1 to about 20:1, or 8:1 to 15:1, wherein the upper and lower trays each have a length of at least about 0.5 L, at least about 0.75 L, or at least 0.9 L relative to the upper and lower pipes respectively, wherein the reaction medium flows on the upper and lower trays generally away from the header, wherein the reaction medium flows on the bottom of the upper and lower pipes generally toward the header, wherein the reaction medium enters and exits at least one of the reactor segments through the header; and (c) recovering a predominately liquid polycondensation product from the reactor, wherein the polycondensation product comprises PET having an average chain length that is at least about 10, at least about 25, or at least 50 greater than the average chain length of the PET in the polycondensation feed.

In one example, the It.V. of or polycondensation feed is in the range of from about 0.1 to about 0.5, about 0.1 to about 0.4, or about 0.15 to about 0.35 dL/g. In one example, the It.V. of or polycondensation product is in the range of from about 0.3 to about 1.2, about 0.35 to about 0.6, or 0.4 to 0.5 dL/g.

In one example, the reactor segments extend outwardly from a common side of the header. In another example, the polycondensation causes the formation of a vapor byproduct, wherein the vapor byproduct is discharged from the reactor via a vapor outlet located near the top of the header, wherein the polycondensation product is recovered from a liquid outlet located near the bottom of the header.

In still another embodiment of the present invention, there is provided a reactor comprising a vertically elongated header and a plurality of vertically spaced horizontally elongated reactor segments coupled to and extending outwardly from the header. At least two of the reactor segments have a proximal end coupled to the header and a distal end spaced from the header. Each of the reactor segments comprises an elongated tubular member and a tray disposed substantially within the tubular member. The tray extends along at least one-half, at least three-quarters, or at least nine-tenths of the length of the tubular member and divides the interior of the tubular member into upper and lower chambers. The upper and lower chambers are in fluid communication with the header at the proximal end.

In one example, the tubular member is directly coupled to the header. In another example, the tubular member comprises a pipe.

In one example, each of the at least two reactor segments defines an internal flow passageway proximate the distal end, wherein the internal flow passageway is configured to permit fluid communication between the upper and lower chambers. Additionally, the at least two reactor segments can each comprise an end cap coupled to the tubular member at the distal end, wherein the tray does not extend all the way to the end cap so that the internal flow passageway is defined by the gap between the tray and the end cap. Additionally, at least one of the reactor segments can comprise an upwardly extending weir coupled to the tray proximate the internal flow passageway.

In one example, the reactor segments extend outwardly from a common side of the header in a substantially horizontal manner.

In one example, the tubular member of each of the at least two reactor segments has a length-to-diameter (L:D) ratio in the range of from about 2:1 to about 50:1, about 5:1 to about 20:1, or 8:1 to 15:1. Additionally the tray disposed substantially within each tubular member has a length of at least about 0.5 L, at least about 0.75 L, or at least 0.9 L wherein the tray presents an upwardly facing flow surface that is spaced at least about 0.1 D, at least about 0.2 D, or at least 0.4 D from the top and/or bottom of the tubular member. In another example, the upwardly facing surface is spaced about 5 to about 50 inches, about 10 to about 40 inches, or 15 to 30 inches from the top and/or bottom of the tubular member. In one example, the maximum depth of the reaction medium on each tray and/or the bottom of each tubular member is less than about 0.8 D, less than about 0.4 D, or less than 0.25 D. The maximum depth of the reaction medium on each tray and/or the bottom of each tubular member can be about 1 to about 40 inches, about 1 to about 32 inches, or 1 to 24 inches. Additionally, the header can have a height-to-width (H:W) ratio in the range of from about 2:1 to about 20:1. Additionally, the diameter-to-width (D:W) ratio of the reactor is in the range of from about 0.1:1 to about 2:1, about 0.25:1 to about 1:1, or 0.4:1 to 0.9:1.

In one example, the header has a height-to-width (H:W) ratio in the range of from about 2:1 to about 20:1 and the L:D ratio of the tubular member is in the range of from about 5:1 to about 20:1, wherein L is in the range of from about 10 to about 200 feet and D is in the range of from about 1 to about 20 feet, wherein H is in the range of from about 8 to about 100 feet, and W is in the range of from about 1 to about 20 feet.

In another example, the at least two reactor segments include a first reactor segment and a second reactor segment, wherein the second reactor segment is located below the first reactor segment, wherein the reactor further comprises first and second flow diverters extending into the header, wherein the first flow diverter is coupled to the tray associated with the first reactor segment, wherein the second flow diverter is coupled to the tray associated with the second reactor segment. Additionally, a vapor gap can be defined by the second flow diverter or between the first and second flow diverters at an elevation above the elevation of the second reactor segment.

Numerical Ranges

The present description uses numerical ranges to quantify certain parameters relating to the invention. It should be understood that when numerical ranges are provided, such ranges are to be construed as providing literal support for claim limitations that only recite the lower value of the range, as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "said" means one or more.

As used herein, the term "agitation" refers to work dissipated into a reaction medium causing fluid flow and/or mixing.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "average chain length" means the average number of repeating units in the polymer. For a polyester, average chain length means the number of repeating acid and alcohol units. Average chain length is synonymous with the number average degree of polymerization (DP). The average chain length can be determined by various means known to those skilled in the art. For example, 1H-NMR can be used to directly determine the chain length based upon end group analysis, and light scattering can be used to measure the weight average molecular weight with correlations used to determine the chain length. Chain length is often calculated based upon correlations with gel permeation chromatography (GPC) measurements and/or viscosity measurements.

As used herein, the terms "comprising," "comprises," and "comprise" are open-ended transition terms used to transition from a subject recited before the term to one or more elements recited after the term, where the element or more elements listed after the transition term are not necessarily the only elements that make up the subject.

As used herein, the terms "containing," "contains," and "contain" have the same open-ended meaning as "comprising," "comprises," and "comprise," provided below.

As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage.

As used herein, the term "directly coupled" refers to a manner of coupling two vessels in fluid flow communication with one another without the use of an intermediate connector having a substantially narrower diameter than the two vessels.

As used herein, the term "esterification" refers to both esterification and ester exchange reactions.

As used herein, the terms "having," "has," and "have" have the same open-ended meaning as "comprising," "comprises," and "comprise," provided above.

As used herein, the term "horizontally elongated" means that the maximum horizontal dimension is larger than the maximum vertical dimension.

As used herein, the terms "including," "includes," and "include" have the same open-ended meaning as "comprising," "comprises," and "comprise," provided above.

As used herein, the term, "mechanical agitation" refers to agitation of a reaction medium caused by physical movement of a rigid or flexible element(s) against or within the reaction medium.

As used herein, the term "open flow area" refers to the open area available for fluid flow, where the open area is measured along a plane that is perpendicular to the direction of flow through the opening.

As used herein, the term "pipe" refers to a substantially straight elongated tubular member having a generally cylindrical sidewall.

As used herein, the terms "polyethylene terephthalate" and "PET" include PET homopolymers and PET copolymers.

As used herein, the terms "polyethylene terephthalate copolymer" and "PET copolymer" mean PET that has been modified by up to 10 mole percent with one or more added comonomers. For example, the terms "polyethylene terephthalate copolymer" and "PET copolymer" include PET modified with up to 10 mole percent isophthalic acid on a 100 mole percent carboxylic acid basis. In another example, the terms "polyethylene terephthalate copolymer" and "PET copolymer" include PET modified with up to 10 mole percent 1,4-cyclohexane dimethanol (CHDM) on a 100 mole percent diol basis.

As used herein, the term "polyester" refers not only to traditional polyesters, but also includes polyester derivatives, such as, for example, polyetheresters, polyester amides, and polyetherester amides.

As used herein, "predominately liquid" means more than 50 volume percent liquid.

As used herein, the term "reaction medium" refers to any medium subjected to chemical reaction.

As used herein, the term "residue" refers to the moiety that is the resulting product of the chemical species in a particular reaction scheme or subsequent formulation or chemical product, regardless of whether the moiety is actually obtained from the chemical species.

As used herein, the term "vapor byproduct" includes the vapor generated by a desired chemical reaction (i.e., a vapor coproduct) and any vapor generated by other reactions (i.e., side reactions) of the reaction medium.

As used herein, the term "vertically elongated" means that the maximum vertical dimension is larger than the maximum horizontal dimension.

CLAIMS NOT LIMITED TO DISCLOSED EMBODIMENTS

The exemplary embodiments of the invention described above are to be used as illustration only, and should not be used in a limiting sense to interpret the scope of the claimed invention. Various modifications to the above-described exemplary embodiments could be readily made by those skilled in the art without departing from the scope of the invention as set forth in the following claims.

What is claimed is:

1. A process comprising: introducing a polycondensation feed into a polycondensation reactor, wherein said polycondensation feed comprises PET and forms a reaction medium in said reactor, subjecting said reaction medium to a polycondensation reaction in said reactor comprising a vertically elongated header and a plurality of vertically spaced horizontally elongated reactor segments coupled to and extending outwardly from said header, wherein said reaction medium flows through said header and said reactor segments as said reaction medium travels through said reactor, wherein said reaction medium enters and exits at least one of said reactor segments through said header.

2. The process of claim 1, wherein said at least one of said reactor segments comprises a substantially horizontal pipe and at least one tray disposed in said pipe, wherein at least a portion of said reaction medium flows on said tray as said reaction medium flows through said at least one of said reactor segments.

3. The process of claim 1, wherein said reaction medium enters and exits at least two of said reactor segments only through said header.

4. The process of claim 1, wherein all of said reactor segments extend outwardly from a common side of said header.

5. The process of claim 4, wherein said reactor comprises at least three of said reactor segments.

6. The process of claim 1, wherein at least two of said reactor segments extend outwardly from different sides of said header.

7. The process of claim 6, wherein said reactor comprises a first set of at least two of said reactor segments and a second set of at least two of said reactor segments, wherein said first and second sets of said reactor segments extend outwardly from opposite sides of said header.

8. The process of claim 1, wherein said reaction medium flows through at least one of said reactor segments along a flow path that includes an outward portion wherein said reaction medium flows away from said header and an inward portion wherein said reaction medium flows towards said header.

9. The process of claim 8, wherein said outward and inward portions of said flow path each extend at least one-half the length of said at least one of said reactor segments.

10. The process of claim 8, wherein said at least one of said reactor segments comprises a horizontally elongated tubular member and a tray disposed substantially within said tubular member, wherein said tray extends along at least one-half the length of said tubular member, wherein said reaction medium flows on said tray when traveling along said outward portion of said flow path, wherein said reaction medium flows on the bottom of said tubular member when traveling along said inward portion of said flow path.

11. The process of claim 10, wherein said at least one of said reactor segments receives said reaction medium onto said tray from said header, wherein said at least one of said reactor segments discharges said reaction medium into said header from the bottom of said tubular member.

12. The process of claim 11, wherein said at least one of said reactor segments discharges a vapor byproduct of said polycondensation reaction into said header, wherein said discharged vapor byproduct flows upwardly in said header while said discharged reaction medium flows downwardly in said header.

13. The process of claim 10, wherein said reaction medium flows from a proximal end of said tray to a distal end of said tray when traveling along said outward flow path, wherein said reaction medium flows over said distal end of said tray and onto the bottom of said tubular member.

14. The process of claim 13, wherein said distal end of said tray comprises an upwardly extending weir over, around, through, and/or under which at least a portion of said reaction medium flows before passing to the bottom of said tubular member.

15. The process of claim 13, wherein said at least one of said reactor segments comprises an end cap coupled to a distal end of said tubular member, wherein said distal end of said tray is horizontally spaced from said end cap to thereby form a flow passageway through which said reaction medium flows as said reaction medium passes from said tray to the bottom of said tubular member.

16. The process of claim 10, wherein said tubular member and said tray are substantially horizontally oriented.

17. The process of claim 16, wherein said tubular member is a pipe.

18. The process of claim 1, wherein said at least one of said reactor segments has a length-to-diameter (L:D) ratio in the range of from about 2:1 to about 50:1.

19. The process of claim 18, wherein said L:D ratio is in the range of from about 5:1 to about 20:1, L is in the range of from about 10 to about 200 feet, and D is in the range of from about 1 to about 20 feet.

20. The process of claim 1, wherein said reaction medium flows downwardly through said header as said reaction medium travels from an upper one of said reactor segments to a lower one of said reactor segments.

21. The process of claim 20, wherein said upper and lower reactor segments comprise respective upper and lower elongated tubular members and upper and lower internal trays disposed in said upper and lower tubular members respectively, wherein at least a portion of said reaction medium flows away from said header on said upper and lower trays, wherein said reaction medium flows towards said header on the bottom of said upper and lower tubular members.

22. The process of claim 21, wherein said reactor further comprises upper and lower flow diverters coupled to said upper and lower trays respectively, wherein said upper and lower flow diverters extend into said header, wherein said lower flow diverter directs said reaction medium exiting the bottom of said upper tubular member downwardly through said header and onto said lower tray.

23. The process of claim 22, wherein a vapor gap is defined by said lower flow diverter or between said upper and lower flow diverters, wherein said vapor gap permits the flow of a vapor byproduct of said polycondensation reaction out of said lower reactor segment and upwardly through said header while said reaction medium exiting said upper reactor segment is directed downwardly through said header.

24. The process of claim 1, wherein a vapor byproduct of said polycondensation reaction from at least two of said reactor segments is combined in said header and exits said reactor via a vapor outlet located near the top of said header.

25. The process of claim 1, wherein a predominately liquid product of said polycondensation reaction exits said reactor via a liquid outlet located near the bottom of said header.

26. The process of claim 1, wherein said header has a height-to-width (H:W) ratio in the range of from about 2:1 to about 20:1, wherein said at least one of said reactor segments has an L:D ratio in the range of from about 2:1 to about 50:1.

27. The process of claim 1, wherein said header extends within 30 degrees of vertical.

28. The process of claim 1, wherein all of said reactor segments extend within 30 degrees of horizontal.

29. The process of claim 1, wherein said reaction medium comprises a liquid within which said polycondensation reaction is carried out.

30. The process of claim 29, wherein said reaction medium comprises a foam portion and a predominately liquid portion, each comprising said liquid.

31. The process of claim 1, wherein the average chain length of the PET in said reaction medium increases by at least about 10 in said reactor.

32. The process of claim 31, wherein the PET in said polycondensation feed has an average chain length in the range of from about 5 to about 50.

33. The process of claim 32, wherein said polycondensation feed is maintained at a temperature in the range of from about 220 to about 350° C., wherein the vapor space pressure in said reactor is maintained in the range of from about 0 to about 30 torr.

34. The process of claim 1, wherein a portion of said reaction medium located in an uppermost one of said reactor segments comprises at least 50 volume percent vapor and a portion of said reaction medium located in a lowermost one of said reactor segments comprises less than 20 volume percent vapor.

35. The process of claim 1, wherein said PET is a PET copolymer comprising at least about 90 mole percent ethylene terephthalate repeat units and up to about 10 mole percent of added comonomer repeat units.

36. The process of claim 35, wherein said added comonomer repeat units are derived from an added comonomer selected from the group consisting of isophthalic acid, 2,6-naphthaline-dicarboxylic acid, 1,4-cyclohexane-dimethanol, diethylene glycol, and combinations of two or more thereof.

37. The process of claim 36, wherein said added comonomer comprises isophthalic acid.

38. The process of claim 25, wherein said PET in said predominantly liquid product of said polycondensation reaction exits said reactor at a rate of at least about 10,000 pounds per hour.

39. The process of claim 1, wherein the average chain length of the PET in said reaction medium increases by at least about 2 in said reactor.

40. The process of claim 39, wherein the PET in said polycondensation feed has an average chain length in the range of from about 1 to about 20.

41. The process of claim 40, wherein said feed is maintained at a temperature in the range of from about 220 to about 350° C., wherein the vapor space pressure in said reactor is maintained in the range of from about 0 to about 300 torr.

42. The process of claim 1, wherein said reactor comprises no mechanical mixing device.

43. A process for making polyethylene terephthalate (PET), said process comprising:
(a) introducing a polycondensation feed into a polycondensation reactor, wherein said polycondensation feed forms a reaction medium in said reactor, wherein said polycondensation feed comprises PET having an average chain length in the range of from about 5 to about 50;
(b) subjecting said reaction medium to a polycondensation reaction in said reactor, wherein said reactor comprises a vertically elongated header and at least two horizontally elongated vertically spaced reactor segments coupled to and extending outwardly from said header, wherein said header provides fluid communication between said reactor segments, wherein said reaction medium passes downwardly through said header as said reaction medium travels from an upper one of said reactor segments to a lower one of said reactor segments, wherein said upper and lower reactor segments comprise respective upper and lower elongated pipes and respective upper and lower internal trays, wherein said upper and lower pipes and trays are substantially horizontally oriented, wherein said upper and lower pipes each have a length-to-diameter (L:D) ratio in the range of from about 2:1 to about 50:1, wherein said upper and lower trays each have a length of at least about 0.75 L relative to said upper and lower pipes respectively, wherein said reaction medium flows on said upper and lower trays away from said header, wherein said reaction medium flows on the bottom of said upper and lower pipes toward said header, wherein said reaction medium enters and exits at least one of said reactor segments through said header; and (c) recovering a predominately liquid polycondensation product from said reactor, wherein said polycondensation product comprises PET having an average chain length that is at least about 10 greater than the average chain length of the PET in said polycondensation feed.

44. The process of claim 43, wherein said reactor segments extend outwardly from a common side of said header.

45. The process of claim 43, wherein said polycondensation reaction causes the formation of a vapor byproduct, wherein said vapor byproduct is discharged from said reactor via a vapor outlet located near the top of said header, wherein said polycondensation product is recovered from a liquid outlet located near the bottom of said header.

46. A reactor comprising: a vertically elongated header and a plurality of vertically spaced horizontally elongated reactor segments coupled to and extending outwardly from said header, wherein at least two of said reactor segments have a proximal end coupled to said header and a distal end spaced from said header, wherein each of said at least two reactor segments comprises an elongated tubular member and a tray disposed substantially within said tubular member, wherein said tray extends along at least one-half of the length of said tubular member, wherein said tray divides the interior of said tubular member into upper and lower chambers, wherein said upper and lower chambers are in fluid communication with said header at said proximal end.

47. The reactor of claim 46, wherein said tubular member is directly coupled to said header.

48. The reactor of claim 46, wherein said tubular member is a pipe.

49. The reactor of claim 46, wherein each of said at least two reactor segments defines an internal flow passageway proximate said distal end, wherein said internal flow passageway is configured to permit fluid communication between said upper and lower chambers.

50. The reactor of claim 49, wherein said at least two reactor segments each comprises an end cap coupled to said tubular member at said distal end, wherein said tray does not extend all the way to said end cap so that said internal flow passageway is defined by the gap between said tray and said end cap.

51. The reactor of claim 50, wherein at least one of said at least two reactor segments comprises an upwardly extending weir coupled to said tray proximate said internal flow passageway.

52. The reactor of claim 46, wherein said reactor segments extend outwardly from a common side of said header in a substantially horizontal manner.

53. The reactor of claim 46, wherein said tubular member has a length-to-diameter (L:D) ratio in the range of from about 2:1 to about 50:1.

54. The reactor of claim 53, wherein said tray has a length of at least about 0.75 L, wherein said tray presents an upwardly facing flow surface that is spaced at least about 0.1 D from the top and bottom of said tubular member.

55. The reactor of claim 53, wherein said header has a height-to-width (H:W) ratio in the range of from about 2:1 to about 20:1.

56. The reactor of claim 55, wherein the D:W ratio of said reactor is in the range of from about 0.1:1 to about 2:1.

57. The reactor of claim 55, wherein said L:D ratio of said tubular member is in the range of from about 5:1 to about 20:1, wherein L is in the range of from about 10 to about 200 feet and D is in the range of from about 1 to about 20 feet, wherein H is in the range of from about 8 to about 100 feet, and W is in the range of from about 1 to about 20 feet.

58. The reactor of claim 46, wherein said at least two reactor segments include a first reactor segment and a second reactor segment, wherein said second reactor segment is located below said first reactor segment, wherein said reactor further comprises first and second flow diverters extending into said header, wherein said first flow diverter is coupled to said tray associated with said first reactor segment, wherein said second flow diverter is coupled to said tray associated with said second reactor segment.

59. The reactor of claim 58, wherein a vapor gap is defined by said second flow diverter or between said first and second flow diverters at an elevation above the elevation of said second reactor segment.

60. The process of claim 1, wherein the PET in said polycondensation feed has an It.V. in the range of from about 0.1 to about 0.5 dL/g.

61. The process of claim 1, further comprising removing a polycondensation product from a product outlet of said reactor, wherein said reaction medium forms said product in said reactor, wherein the It.V. of the PET in said polycondensation product is in the range of from about 0.3 to about 1.2 dL/g.

62. The process of claim 32 further comprising removing a polycondensation product from a product outlet of said reactor, wherein said reaction medium forms said polycondensation product, wherein the It.V. of the PET in said polycondensation product is in the range of from about 0.3 to about 1.2 dL/g.

63. The process of claim 43 wherein the It.V. of the PET in said polycondensation feed is in the range of from about 0.1 to about 0.5 dL/g.

64. The process of claim 43 wherein the It.V. of the PET in said polycondensation product is in the range of from about 0.3 to about 1.2 dL/g.

65. The process of claim 1, wherein said reactor comprises an uppermost reactor segment, wherein said uppermost reactor segment comprises a horizontally elongated pipe and does not comprise a tray disposed in said pipe, and wherein said uppermost reactor segment is horizontal.

66. The process of claim 65, wherein said uppermost reactor segment defines a proximal end and a distal end, wherein said proximal end is coupled to said vertically elongated header, and wherein said uppermost reactor segment further defines a feed inlet near said distal end.

67. The process of claim 66, wherein said polycondensation feed is introduced into said reactor through said feed inlet, and wherein said reaction medium flows through said uppermost reactor segment toward said vertically elongated header.

68. The process of claim 43, wherein said reactor further comprises an uppermost reactor segment, wherein said uppermost reactor segment comprises a horizontally elongated pipe having a length-to-diameter (L:D) ratio in the range of from about 2:1 to about 50:1 and does not comprise a tray disposed in said pipe, and wherein said uppermost reactor segment is horizontal.

69. The process of claim 68, wherein said uppermost reactor segment defines a feed inlet through which said polycondensation feed is introduced into said reactor, and wherein said reaction medium flows through said uppermost reactor segment toward said vertically elongated header.

* * * * *